United States Patent
Smith

(10) Patent No.: US 7,484,032 B2
(45) Date of Patent: Jan. 27, 2009

(54) FAULT TOLERANT COMPUTER SYSTEM

(76) Inventor: Roger A. Smith, 2735 Barlow Dr., Castro Valley, CA (US) 94546

( * ) Notice: Subject to any disclaimer, the term of this patent is extended or adjusted under 35 U.S.C. 154(b) by 227 days.

(21) Appl. No.: 11/160,620

(22) Filed: Jun. 30, 2005

(65) Prior Publication Data

US 2007/0005861 A1   Jan. 4, 2007

(51) Int. Cl.
*G06F 13/00* (2006.01)
*G06F 11/00* (2006.01)

(52) U.S. Cl. .................. 710/316; 710/104; 714/9

(58) Field of Classification Search .......... 710/38, 710/305, 306, 309, 316, 317, 260–269, 104; 709/214, 226, 229, 244, 249, 252; 714/100, 714/1, 2, 11, 12, 9

See application file for complete search history.

(56) References Cited

U.S. PATENT DOCUMENTS

| | | | | |
|---|---|---|---|---|
| 5,774,698 A | * | 6/1998 | Olnowich | 712/1 |
| 5,949,982 A | * | 9/1999 | Frankeny et al. | 710/317 |
| 6,035,414 A | * | 3/2000 | Okazawa et al. | 714/7 |
| 6,085,276 A | * | 7/2000 | VanDoren et al. | 710/240 |
| 6,125,418 A | * | 9/2000 | Cox et al. | 710/104 |
| 6,125,429 A | * | 9/2000 | Goodwin et al. | 711/143 |
| 6,378,021 B1 | * | 4/2002 | Okazawa et al. | 710/317 |
| 6,564,277 B1 | * | 5/2003 | Keen et al. | 710/268 |
| 6,628,662 B1 | * | 9/2003 | Blackmon et al. | 370/447 |
| 6,996,645 B1 | * | 2/2006 | Wiedenman et al. | 710/107 |
| 7,058,738 B2 | * | 6/2006 | Stufflebeam, Jr. | 710/104 |
| 7,080,291 B2 | * | 7/2006 | Moriki et al. | 714/53 |
| 2003/0093501 A1 | * | 5/2003 | Carlson et al. | 709/220 |
| 2003/0198213 A1 | * | 10/2003 | Jensen et al. | 370/351 |
| 2003/0202510 A1 | * | 10/2003 | Witkowski et al. | 370/386 |
| 2004/0215773 A1 | * | 10/2004 | Strait et al. | 709/225 |

* cited by examiner

*Primary Examiner*—Glenn A Auve
*Assistant Examiner*—Trisha Vu
(74) *Attorney, Agent, or Firm*—Thomas J. Tighe, Esq.

(57) ABSTRACT

A computing hardware and software device called a Meta Mentor Central Processing Unit. The Meta Mentor purpose is to control memory, input/output interfaces, defining the operating system, the scheduling processes and the parsing of individual threads to an array of slave Processing Units that are uniquely connected, thus creating a highly optimized computing core. In effect, the Meta Mentor tells the array of slave processors what to process by controlling all external and internal system input/output and individual processor scheduling.

19 Claims, 16 Drawing Sheets

FAULT TOLERANT COMPUTER SYSTEM

This invention relates in general to highly fault-tolerant, dynamically erected, distributed processing systems, and, in particular, to a hierarchical system controlled at the highest level by one or more interconnected overseeing processors that are each termed herein a "Meta Mentor". Each Meta Mentor (also referred to as an MM) controls the memory, the input/output interfaces, the operating systems, and the scheduling of processes being executed by an array of lower level processors, i.e., termed herein as "slave processing units" that are uniquely connected. Each Meta Mentor parses, distributes, and schedules in a dynamically optimized and fault tolerant fashion, all processes and processing threads under its control to each associated slave processing unit ("SPU").

BACKGROUND

One of the first computing models was the mainframe model. This model featured a central processing unit ("CPU"), volatile memory storage, and input/output ("I/O") devices. It often had different cabinets for each component storage, I/O, RAM (random access memory), task, program, and job management. According to this model, the host mainframe processor manages multiple processes and I/O devices, but all processes are run on the host mainframe with the user interfaces being "dumb" terminals communicating with the mainframe but not running any of the processes. Communication between the mainframe and the user terminals is handled by a program running (usually in the background) on the mainframe. Other than user interface information, nothing else is communicated between the host mainframe and the terminals. In effect, the terminal users are connected to a large computer (the mainframe) by long wires.

It is important to note that the operating systems for modern mainframes are limited in number, e.g., UNIX, Linux, VMS, Z/OS, Z/VM, VSE/ESA. Conventionally a mainframe's control is limited to the processes being run within the boundaries of its computing machinery. Machines and other CPUs (central processing units) not associated with the mainframe's CPU and its operating system (OS) are treated as foreign systems—each foreign system conventionally consisting of a CPU, input/output memory and other devices. Conventionally each mainframe CPU runs a single instance of its operating system, and is dedicated to that system and the operating system schedules CPU cycles and allocates memory only within that system.

The above mainframe model was the standard until the late 1960's and early 1970's when several components of a mainframe were consolidated into what are now known as "microprocessors." In conventional microprocessors, memory management, arithmetic units and internal registers are incorporated into a single integrated circuit (commonly called a "chip"). Peripheral devices are handled by various interrupt schemes. Conventionally these interrupts are electrical signals originating, directly or indirectly, from external peripherals for the purpose of interrupting the microprocessor's normal processing to service a peripheral device that requires immediate attention. A keystroke on a keyboard is good example of a peripheral that can normally create an interrupt and initiate an interrupt cycle. When a key is depressed, an interrupt is generated to the microprocessor's CPU by presenting a high or low signal on one of the microprocessor's interrupt pins. When an interrupt occurs the CPU must relocate all information relevant to its 'current' job to an external location, i.e., a "stack" memory. The information stored in the stack generally includes the contents of all the CPU registers, program counter information or the memory address of the program that it was executing before the interrupt. This stack information is stored to enable the CPU to return to its pre-interrupt state after servicing the interrupt, the pre-interrupt state being defined by the contents of the stack. When the CPU services the interrupt, it starts with a blank page, and a known state. After putting the 'current' job contents on the stack, the CPU examines a known location in memory to determine which device produced the interrupt. In the keyboard case, the CPU determines that a key was depressed, 'jumps' to a memory address, starts executing the program code that determines which key was depressed, and puts the results in memory, memory cache, or CPU register. After 'servicing' the interrupt, the CPU retrieves the pre-interrupt information, restores all relevant registers and counters to their pre-interrupt states, and returns to the task (the current job) it was performing before the interrupt occurred. In conventional microprocessor based disk operating systems, each microprocessor within the computing machine is dedicated to that operating system, disk storage, memory, program counter, and system scheduler; and the operating system manages its memory, interrupt stack, keyboard and so forth.

Microprocessor based systems have a huge cost savings over mainframe computers. They require less maintenance, can be massed produced, and they have far more software available at affordable prices. However, the microprocessor systems are less reliable than a mainframe system. Microprocessors are prone to system freezes and component failure. When performing system maintenance, microprocessor systems must be taken off-line and brought down to a single user state, or turned off altogether. In mainframe systems, system maintenance can be performed while the machine is running, which is advantageous when the computer system must be online all the time. Each computer system's architecture and structure determines the cost, type of maintenance, and the reliability of that system. In the microprocessor system each CPU is dedicated to a single operating system, so when a problem/fault occurs, the whole computing machinery stops. These faults can be hardware or software related, but each system will come to a halt if a critical system part fails or even a single CPU becomes lost or misdirected through some software error. The reliability problem has been attacked from several directions. Redundancy is the most common approach, e.g., double or even triple mirrored storage systems, duel ported memory, and more.

Several computer architectures have addressed these problems. In the early 1990's, CRAY computers developed a microprocessor based computer that was dubbed, "Highly Available." It featured redundant computer systems each having its own memory, I/O, and scheduler. The redundant systems shared a common data storage, either in disk or tape storage, and featured a time monitor, commonly called "watch dog timer;" i.e., if one system didn't respond to a signal from the other system in some selected amount of time, the monitor would assume that the non-responding system was "down" and would start up new processes on the remaining system to replace those lost on the failed system. Any process or user that was connected to the failed system needed to restart the process on the remaining system since it was available for processing the tasks that were performed by the failed system. This redundancy makes this type of computing system highly reliable, and the act of bringing up the processes on the new system is called "highly available." As an example, during the Sep. 11, 2001 crisis when Highly Available systems located in New York failed, they failed-over to systems in New Jersey and Wilmington Del.

In addition, some of the microprocessor-based systems are capable of reallocating CPU's. Two or more operating systems can be loaded on a machine with multiple CPU's of the same type and manufacture, and each of these CPU's can be allocated to a particular operating system by manual re-deployment. Each operating system has its own memory, I/O, and scheduler, and interrupt system. However, once a CPU is committed to an operating system within the computing machine and that machine fails, the CPU will fail with that machine and cannot be reused until the operating system is restarted, or manual intervention reassigns the CPU. The main advantage of this type of system is its ability to distribute processes and processing threads to several processors which significantly decreases computing time.

Most of the world's fastest computers utilize hosts of microprocessors for parallel processing but such systems are extremely complex. For example, "backplane" circuit boards that connect the microprocessors together require as many as thirty-two circuit layers and are so complicated that only a single manufacturer is capable of producing these complex circuit boards.

Clustering is another technique used to increase reliability and decrease computing time. Currently certain vendors, like CRAY, IBM, HP, and SUN MICROSYSTEMS have increased the number of systems that can join a cluster from two to thirty-two, but each machine acts independently of one another and does not share a common memory between operating systems. It has no control over program counters and does not attempt to make the system more than highly available.

Another type of clustering system is available for Linux systems called a "Beowulf cluster" which is a type of parallel system that utilizes PC (personal computer) style microprocessors. It is a cluster of desktop-type computers that are networked with one of the computers acting as a master. Users can log in to the master node and run a script which will run their program on the slave nodes of the cluster. This program can contain a specially designed code, such as MPI, to communicate with its siblings on the other node. Each slave's individual process can use this code to communicate with all of the other processes to transmit data, calculations results, etc., combining the power of all of the computers into one virtual super computer. The problem with the Beowulf system is that if one of the master systems is lost, the whole cluster must be rebooted because the master system has lost the state of the machine. Without knowing the system state, the only option is to start over from scratch and a reboot is required. In addition, each slave computer has its own set of memory, its own I/O, interrupt vectors, stacks, and schedulers. It is the unknown state of these items that require the entire system to be rebooted.

The Meta Mentor system of this invention is highly advantageous compared to the above mentioned solutions because it employs novel parallel processing techniques to significantly reduce computing time, while it also avoids the loss-of-state problems when one of the parallel processors or system components catastrophically fails. The system according to this invention is thus superior to even the "highly available" prior art.

Other advantages and attributes of this invention can be seen from a reading of the specification herein and a viewing of the drawings.

BRIEF DESCRIPTION OF THE DRAWINGS

FIG. 11 shows a starting "star" configuration.

FIG. 12 further illustrates examples of data paths.

FIG. 13 further illustrates control paths of the Meta Mentor's functions.

DESCRIPTION

This invention consists of both hardware and software. The software can be termed a "meta operating system" (MOS). An MOS has generally the same features of a generic or regular operating system (ROS), but the MOS controls the scheduling, memory translation, and the hardware abstraction layer (HAL) of each slave ROS under its control. The MOS defines the frame of reference for each ROS and handles all information going to and from each ROS.

Figure 1:
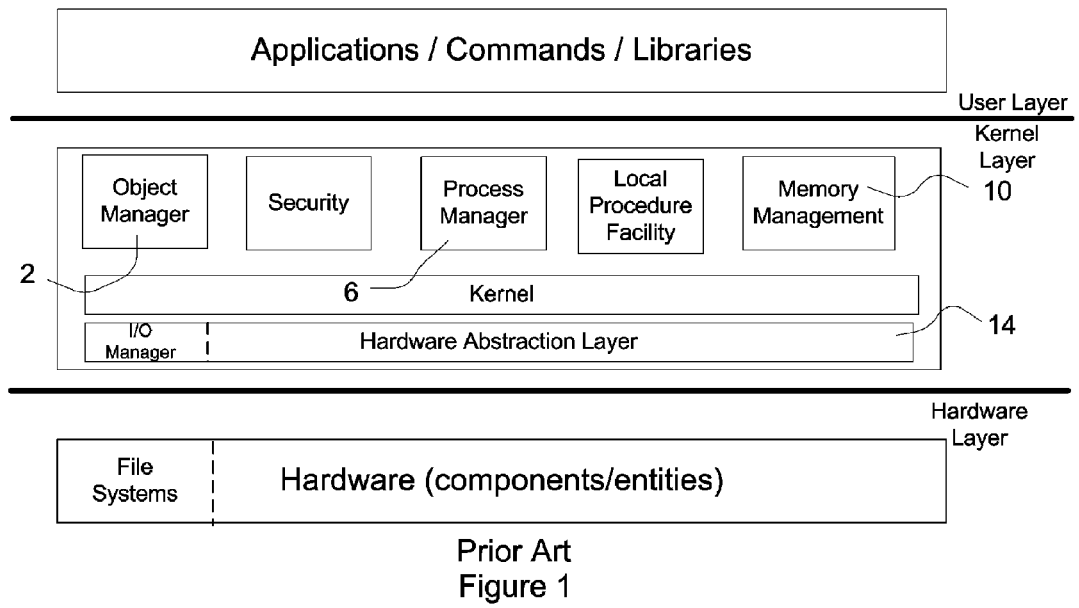
FIGS. 1 and 2 are block diagrams illustrating, respectively, a conventional operating system, and a comparable operating system, according to this invention, selectively assignable to an SPU of a Meta Mentor according to this invention.
Figure 2:
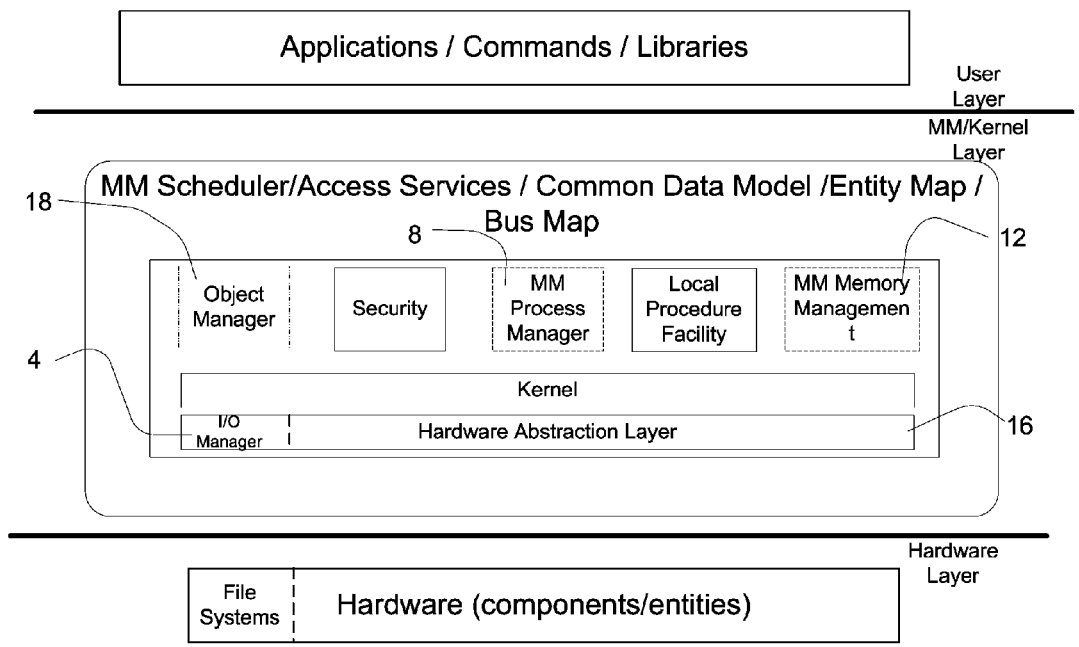

This is best illustrated in FIGS. 1 and 2, where it can be seen that a conventional ROS's I/O manager 2 is replaced by a Meta Mentor I/O manager 4 for the purpose of giving the Meta Mentor complete control over all I/O processes previously controlled by the ROS. Also the ROS's process manager 6 has been replaced by a Meta Mentor process manager 8 so that all processes being run under the ROS are managed by the Meta Mentor. Likewise, the ROS's virtual memory manager 10 has been replaced by an MM memory manager 12 so that the Meta Mentor completely controls all ROS memory accesses. Likewise, the ROS's hardware abstraction layer (HAL) 14 has been replaced by a Meta Mentor hardware abstraction layer (MMHAL) 16 so that the Meta Mentor completely controls the hardware devices (entities) through its algorithm. In this invention the object manager 18 is divided between objects that are managed within the ROS and objects that are managed outside of the ROS. The later case is managed by the MOS.

Figure 3:
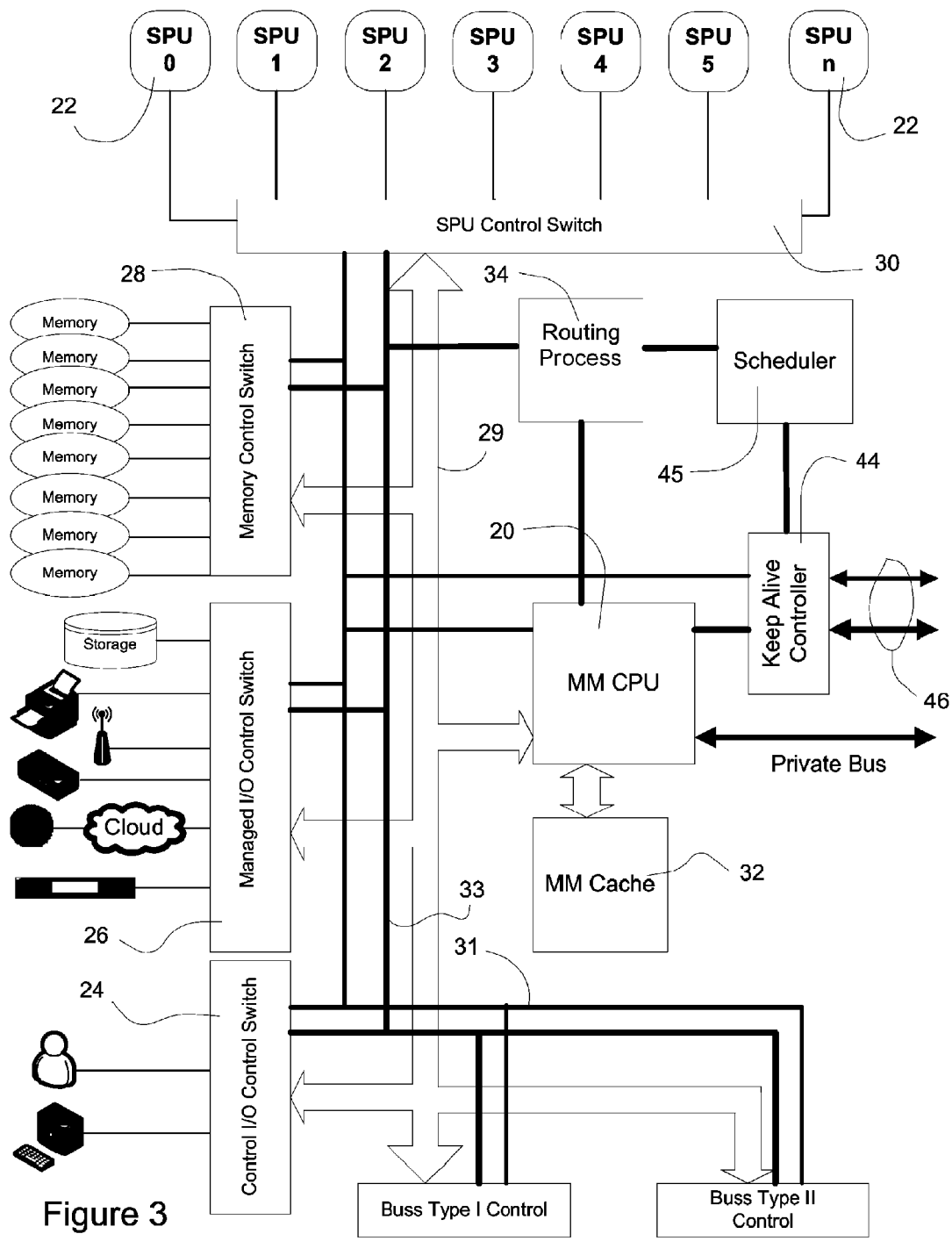
FIG. 3 is a block diagram illustrating the physical topology of a Meta Mentor according to this invention.

Referring to FIG. 3, the physical layout of a Meta Mentor system according to this invention is illustrated. It includes a Meta Mentor central processing unit (MMCPU) 20 which can be a single device or a series of devices that operate to perform this function. It can even be implemented in a state machine. The MMCPU primarily runs the overseeing algorithm that monitors, stores, and controls all of the events pertaining to the machine. It schedules threads to an array of SPUs 22, monitors their progress and can detect faults signals. It distributes system and I/O resources and creates interrupts to the SPUs, and stores their memory stacks. The MMCPU also decides which SPU will continue a process following the servicing of an interrupt. This means that the SPU that was interrupted will not necessarily be the same processor to which the MMCPU returns the stack information; the MMCPU can decide to return the stack information to a different SPU (running the same OS). By the same token, the same operating system may or may not be assigned to the same processor when servicing the interrupt. As long as the operating system is compatible with the SPU it will be up to the MMCPU algorithm to determine which processor will be assigned to an operating system. In addition, to handling the interrupt and stack, the MMCPU algorithm handles and stores all events leading up to an interrupt. In this way, the MMCPU always 'knows' the state of every process on the machine.

There is another benefit of this type of control. The SPUs' computing throughput is increased because the scheduling of the SPUs is preferably optimized to minimize or eliminate the interrupts altogether. Since no one SPU is tied to a given process there is no need to interrupt a particular SPU to service an interrupt. In fact, there is no reason for any device, SPU or other, to wait if there is any resource available for servicing the calling device. For example, if SPU-1 is waiting for a response from an I/O device, SPU-1 can be employed by another process/thread for completion rather than sit idle, and when the I/O device completes its task and presents its data, the MMCPU can schedule an idle resource, for example SPU-2, to complete the process that was originally started with SPU-1. Another example would be the keystroke previously mentioned. Depressing a key on a keyboard need not cause an interrupt of any particular SPU to handle the service request, the MMCPU can assign the interrupt servicing to any idle SPU, and thus any processor executing a process/thread would not be interrupted. This serves to significantly speed-up the overall processing of the system.

Referring again to FIG. 3, each Meta Mentor includes a plurality of control switches: control I/O 24, managed I/O 26, memory 28, and an SPU switch 30 for selecting among the plurality of SPUs. The control switches will be explained in further detail below. Each Meta Mentor also includes an MM cache 32 and a routing process 34 that preferably includes a routing table CPU (not shown). The MMCPU controls these switches that route the information from one place to another via data paths, parallel 29 and/or serial 31. The MMCPU directs the data routing by modifying the routing tables which effectively allows a virtual address to take the place of the physical address of any device. For example, the SPU control switch 30 can route a "fetch" or "put" (read/write) to memory or any I/O device coupled to a control switch. This has the same effect as initiating a fetch or put to a switched bank of standard memory. Moreover, the MMCPU monitors and schedules all devices; therefore the MMCPU can schedule any processor to communicate with any stick of memory via the memory control switch. As will be further described below, a process and its associated memory space can be assigned to any SPU or device that is connected to the system.

In this way the MMCPU algorithm can construct any component to the system as needed to accomplish just-in-time processing to complete a process. Memory or components can be assigned to minimize or eliminate component and bus contention on the device by assigning separate memory devices (sticks) to different processes or threads to speed through-put.

Figure 4:
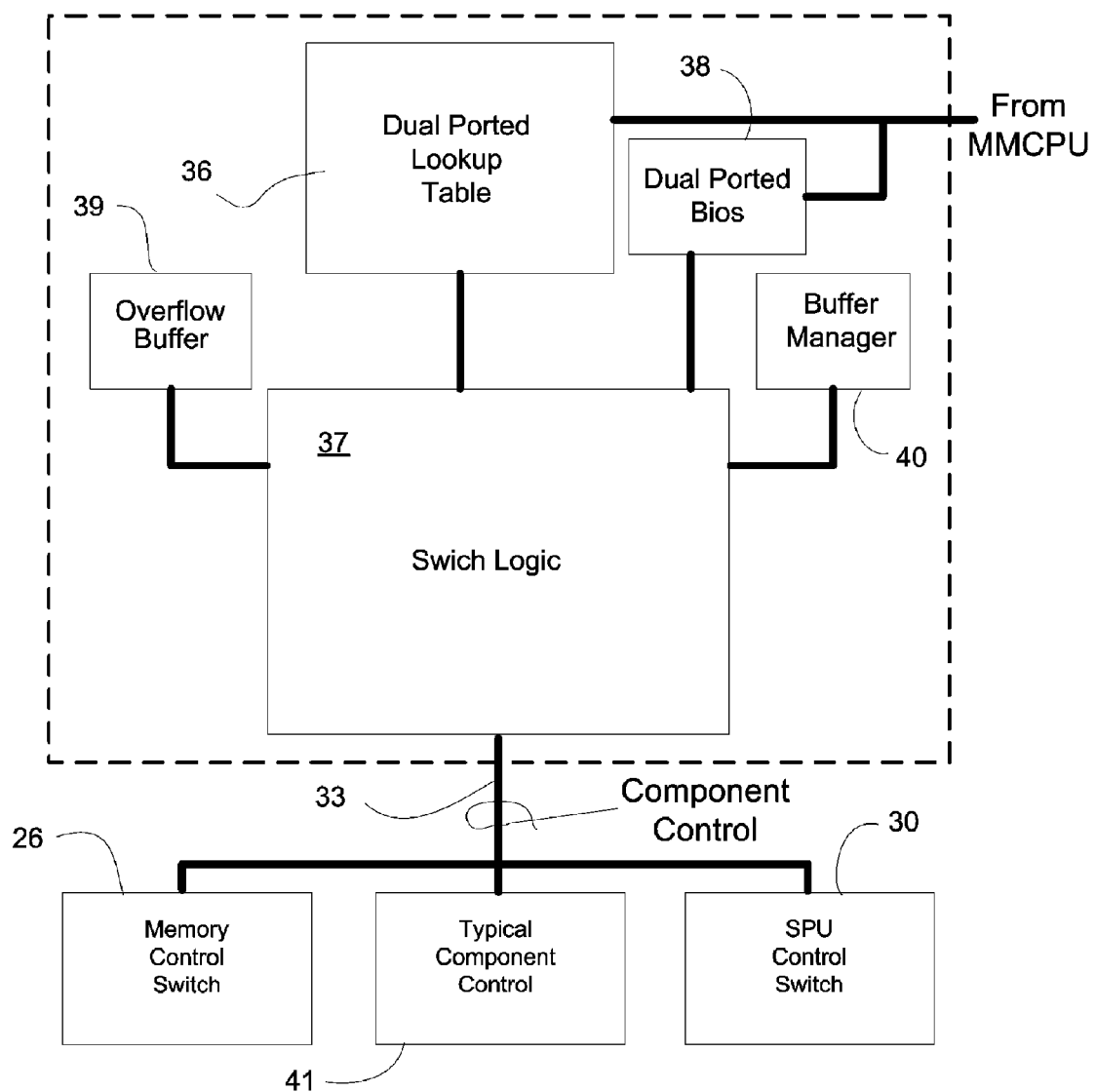
FIG. 4 is a block diagram illustrating a preferred routing process according to this invention.

Referring to FIGS. 3 and 4, an example of a control switch used for the routing process 34 is illustrated. This example includes a dual ported lookup table control device, a device found in the industry that controls ethernet switches at up to several gigabytes per second. For an operational example, if the MMCPU assigns SPU-2 to memory address xxxxx thru yyyyy on a port N of the memory control switch 28, it transforms the address and switch, based upon its writing that information into the routing table 36. The SPU's address space is transformed by the control switches. In operation, the address space can be modified either at the SPU control switch 30 or the memory control switch 28. The Meta Mentor creates an environment where the processes going into or from a virtual computing machine are controlled, manipulated, and scheduled by the MM. FIG. 4 is a block diagram illustrating the functions of a preferred routing process 34. In operation, the MMCPU writes the address information into the above-mentioned dual ported lookup table 36. A switch logic 37 communicates routing control signals 33 to the various control switches (26, 30 and 41) according to an algorithm written into a dual ported bios 38. The MMCPU can alter the switch logic algorithm by altering the content of the dual ported bios. The switch logic gets its switching algorithm from the dual ported bios 38 and its switching information from the dual ported lookup table 36. An overflow buffer 39 and buffer manager 40 manage any information or data overflow to and from the switch logic 37.

Referring to FIG. 3, also shown is a keep alive controller (KAC) 44 whose function is to transmit and receive information to and from other MM machines or devices outside the MM's frame of reference. Preferably the information is shared among MM devices via data and control lines 46, and consists of process data, process table and machine state. A scheduler 45 works with the routing process to schedule keep alive data transfers to other MM devices, i.e. when it can pull data from the routing cache to put to other MM devices. The routing process tells the scheduler to pass (route) data to other MM devices. The scheduler also services keep alive information coming from other MM devices and schedules the placement of same on the local bus. Alternatively, the scheduler could be incorporated in the KAC. For a keep alive example, when the switches are configured to dual port the data from the SPU control switch 30, one path can transmit the data to the memory switch 28 and the other path can transmit the same data to the KAC 44 which forwards it to one or more MM devices. When another MM device receives the forwarded data it writes the data to either its respective memory control switch or its respective MM cache. This redundant memory storage functions as a backup that can be used if needed. In a similar fashion an SPU can dual/multiple port information to a redundant disk storage device using the managed I/O switch 26. In this latter case both disk storage systems are dual ported, one path to the local MM and the other path to a remote MM. This porting process allows the data and state information to be current on two or more MM devices thus creating a fault tolerant environment described in FIG. 9. However, the multiple port process is optional and this option can be exercised when the process is run.

In preferable operation, when power is applied to the system, the control switches' default positions point to a location in memory where all SPUs are put into an idle state. The MMCPU is pointed to a place that loads the MMCPU boot program and its algorithms into its cache memory. The system then proceeds through a system check based upon the MMCPU boot program. Next, the operating systems that will process future tasks, i.e., the native operating systems' ROS, are loaded. This is accomplished by the MMCPU assigning the boot interrupt vector to preferably SPU-1. SPU-1 then boots normally for the resources that have been erected by the MMCPU and switches. The resources are assigned and configured by the MMCPU and tested by SPU-1. After the first ROS operating system is loaded into the memory that is configured and managed by the MMCPU, the MMCPU assigns SPU-1 to run a process where SPU-1 is put into an idle state. At this time all ROS memory locations, interrupt service addresses and drivers are known by the MOS having been dynamically assigned by the MMCPU and its algorithms. Then, by the algorithm defined in the MMCPU boot programs, the same process occurs again and the MMCPU assigns SPU-1 to load another operating system into another address space. The MM is not limited to one processor product type. As an operational example, assume now that a third operating system is loaded using an SPU-6, a microprocessor whose instruction set (micro-code) is incompatible with SPU-1. The SPU-6 operating system will only work with SPU-6 processor micro-code and will not function with the micro-code used by SPU-1. However, both operating systems can use common Meta Mentor resources and can even task other each other's operating system to perform operations based upon function and not hardware characteristics. The whole boot process is controlled by the MMCPU algorithms and functions according to how the algorithm executes and controls the address control switches. After the boot is complete the MMCPU monitors and will execute commands, processes, and threads as it processes information coming in from outside the frame of reference or operating internals from within the frame of reference.

A click of a mouse, for example, sets MMCPU to assigning addresses to an SPU-n to perform tasks to respond to the mouse click. Address spaces are assigned in the routing tables by the MMCPU to erect a virtual machine as called for by the processes to respond to the mouse click.

In addition, when the switches are configured to perform 'writes' from a ROS to memory, the switches can be configured to dual port the data being written to two or more places and/or devices. This can be accomplished by either partitioning the memory within a Meta Mentor or by connecting two or more Meta Mentors together. Duplicating Meta Mentors can be defined as a fault tolerant system. In a process that is explained later, dual porting the memory can be accessed in a leap-frog manner, such that any process, or possibly a thread, that is started by a Meta Mentor can be restarted from a known state. This is accomplished by saving the state information of the machine state when a process is started from any frame of reference, or is changed to a known state.

Because the processes/threads and devices are independent and the MMCPU controls a known state of the machine, it can protect itself against system and software failure. For example, if an SPU should fail, the MMCPU can recreate the state of the failed SPU by placing its last known state, i.e., the stack contents, onto the next available SPU and 'replaying' the events that created the process/thread that was lost. If there are no interrupts associated with the process/thread, the MMCPU can restart the process/thread on another available SPU. Another algorithm can detect software failure by detecting no response from a SPU module and resubmitting the errant code to another SPU. Seeing the failure only with that process/thread over more than one SPU and checking the state of the first SPU, the MMCPU's algorithm can conclude the software code had problems and stop that process/thread from proceeding further.

Another feature is that all buses are unique to their respective devices or ports. They are dynamic and can operate independently or asynchronously. If a failure occurs at a device or port, the Meta Mentor can reassign the virtual address to another device that is functional, even reassigning the device driver. Another consequence of the asynchronous bus operation is that a device does not need to wait for access to the bus. Because the paths between devices and/or ports are unique to each device or port, no processor cycles are lost due to bus arbitration, thus significantly streamlining data flow. This feature, among others, sets the invention patently apart from other prior art systems.

Because of the asynchronous nature of the inter-processor communications, they may be done either in a parallel or serial fashion. Preferably the exchanges between the MMCPU and the SPUs are done in a serial fashion. This feature significantly reduces the number of traces required to communicate to the SPUs thus allowing the system to become more scaleable since the number of SPUs connected to the MMCPU is not limited to the data line traces or processing speed.

Because preferably there are redundant MMCPU machines with typical redundant independent power resources and synchronized actions, the MMCPU machine is a fault tolerant machine as opposed to "highly available".

Referring again to FIG. 3, communications between MMCPUs exchange information about entity mapping among erected components and their address spaces. Interconnected MMCPU communication is accomplished by peer control and I/O ports through a keep-alive controller 44 associated with each MMCPU. The communications are accomplished by preferably a high-speed serialized link 46. Although the design is not limited to serialized communications, this approach eliminates the need for complex circuit boards to manage communications among MMCPUs. The algorithm includes a protocol for these communications that is brief and allows the peer MMCPU rapid access to the other MMCPU memory.

Besides making the MMCPU fault tolerant, the I/O for the machine also becomes fault tolerant. This is accomplished through redundant asynchronous hardware and the MMCPU algorithm. For example in network communications any communications port can be assigned to any operating system's process. Should one of the redundant ports fail, the MMCPU can assign a working port to the process. If a port to a disk fails, another port can take its place without data loss to the system or disk.

The MMCPU can communicate directly to security devices, logging devices and access lists such as "Lightweight Directory Access Protocol" (LDAP) or Active Directory. These access lists basically are simple network-accessible centralized databases that store information about the authorization and privilege each user, entity, or resource is allowed. Thus the security for each ROS is relegated to the MOS in the same virtual fashion as any other resource within the erected framework. In addition, the MOS security algorithms act independently of the ROS security to provide an additional layer of security that cannot be accessed by the ROS.

Figure 16:
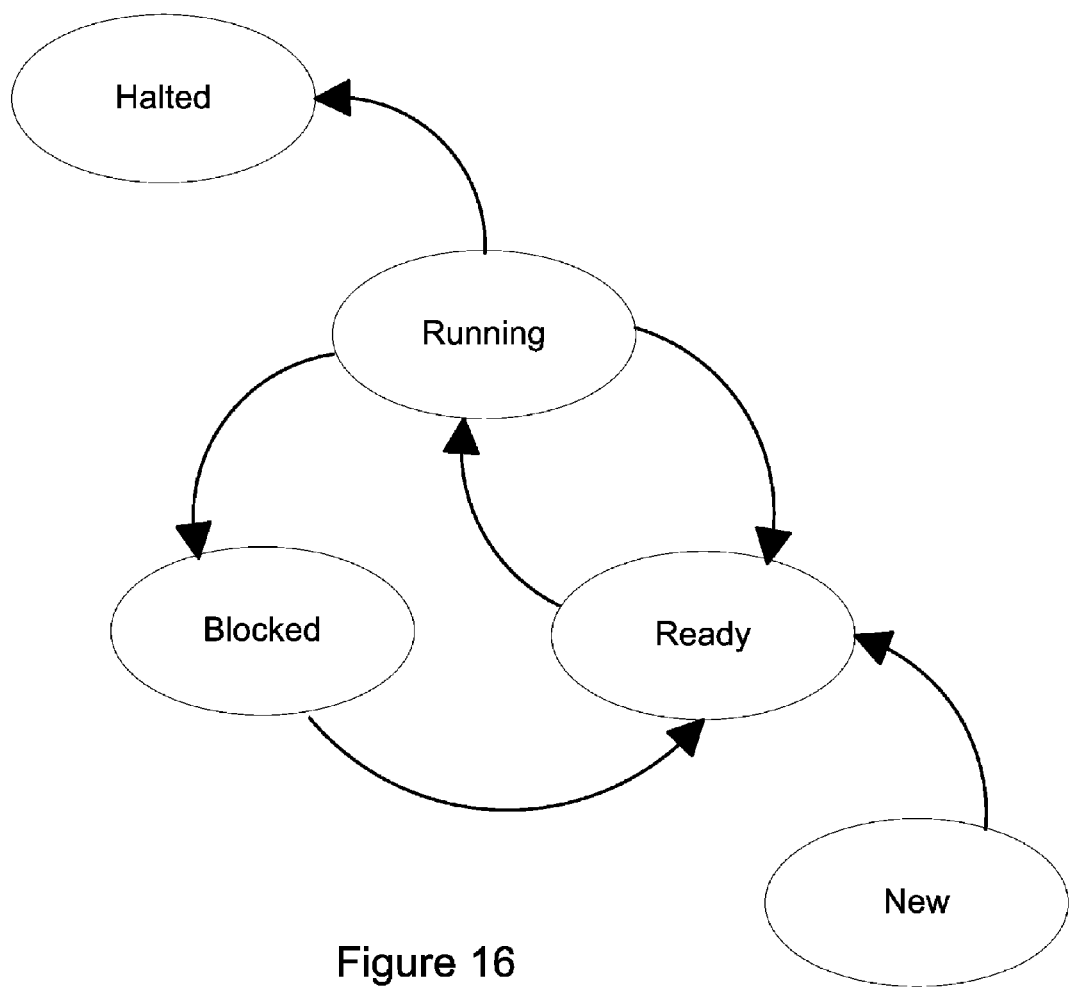
FIG. 16 illustrates possible states of computing processes

Referring to FIG. 16, in general, there are five operational states of a process as follows: (1) "running"—actually using the CPU at that instant; (2) "blocked"—unable to run until some external event happens; (3) "ready"—runnable but temporarily stopped to let another process run; (4) "halted"—when a process has terminated; and (5) "new"—when a new process is waiting to be queued to the ready state. Although systems with internal caches and pipe line capabilities may be said to have more states, they at some point, can be defined in terms of the five states listed above. The state transitions are important. Once put into the running state, the machine can only go to blocked and ready. The blocked state can only go to ready state, and this occurs when the system is ready to be scheduled for a process.

Figure 5:
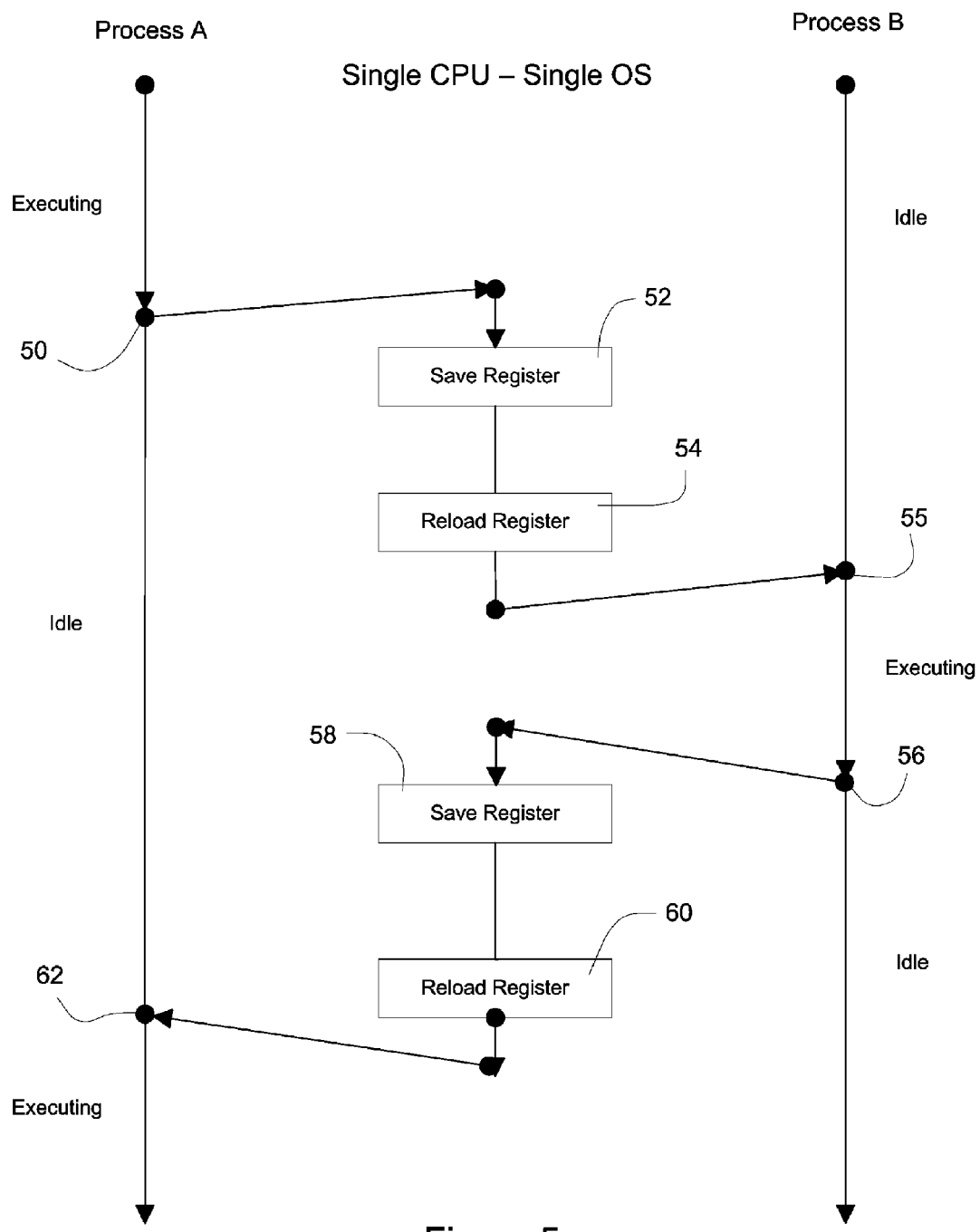
FIG. 5 is a process flow diagram illustrating two processes (A and B) conventionally sharing time on a single CPU.

Referring to FIG. 5, the process flow of two typical processes (A and B) conventionally sharing time on a single processing unit is illustrated. As is commonly known, a process is an activity of some kind. It has a program, input, output, and at any given time a state. A single processor may be shared among several processes, with some scheduling algorithm being used to determine when to stop work on one process and service a different one. In the Meta Mentor case, at the end of the bootstrap cycle in the MM, all processes are halted except for the ones monitoring the machine state. In a Microsoft Windows example, this state shows up on the Windows Task Manager environment in the box as System Idle Process. To implement the process model, a conventional operating system maintains a table, an array of structures, called a process table. Each entry identifies a process with information such as process state, its program counter, stack pointer, memory allocation, the status of its open files, its accounting and scheduling information. In another words, it must contain everything about the process that must be saved when the process is switched from the running state to the ready state so that it can be restarted later as if it had never been stopped. A switching between two processes running under a single processing unit is illustrated in FIG. 5. Process A is executing while process B is idle. At some point 50 the processing unit interrupts process A, e.g. its time slice has exhausted or an interrupt has occurred, and process A's state is saved in a stack (not shown), illustrated as a saving of the concurrent contents of the processing unit's registers labeled "Save Register" 52. The state of process B is then loaded into the processing unit's registers ("Reload Register") 54 and process B then begins executing 55. At some point process B is stopped 56, B's state is saved in the stack 58, and the previously saved state of process A is loaded into the processing unit's registers 60 and process A resumes execution 62.

In this invention the Meta Mentor assigns and controls each process table and stack by preferably defining their addresses through the memory switch. The Meta Mentor also defines the scheduling and information control of each process; therefore, the MM can define all machine states within its frame of reference.

Figure 6:
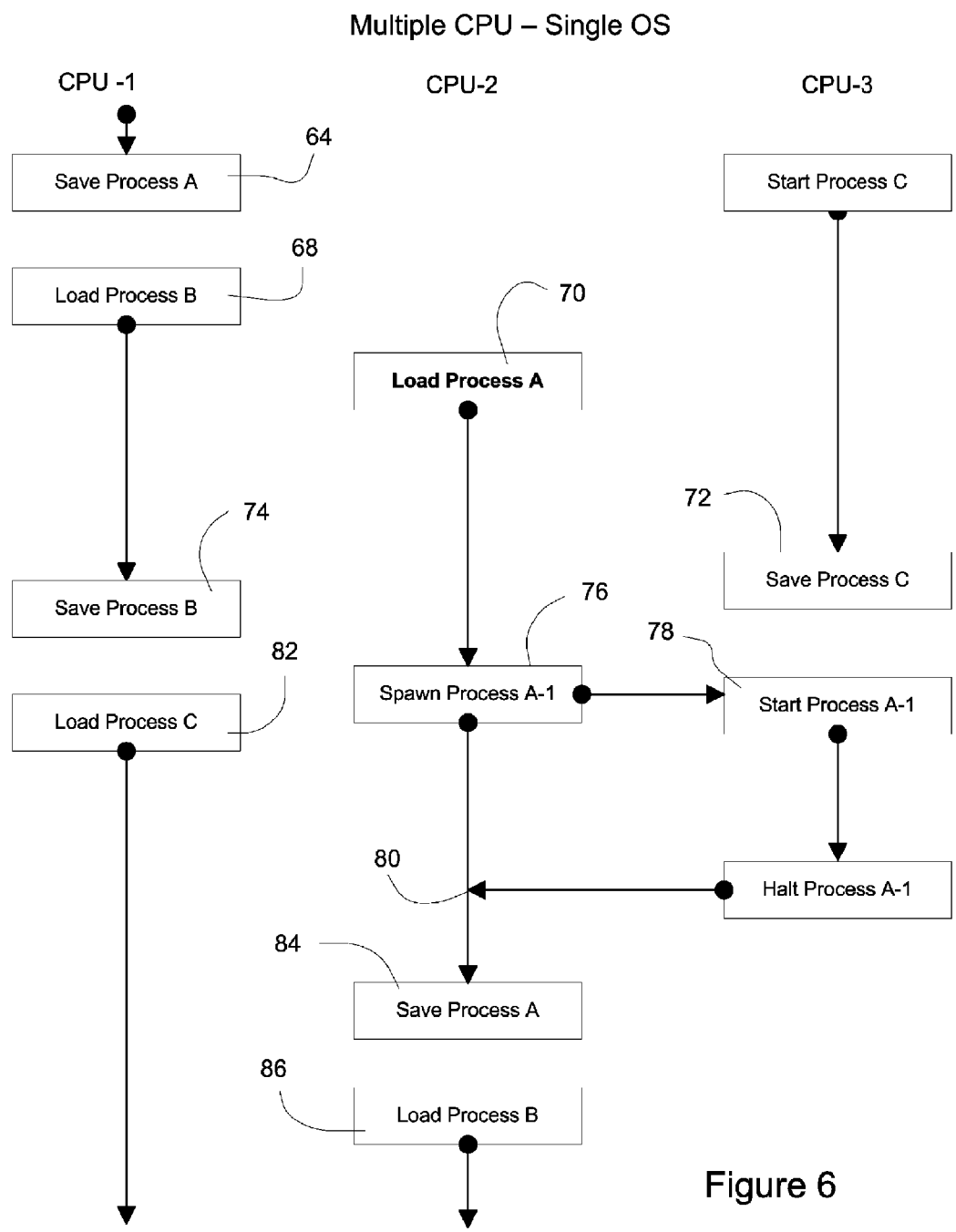
FIG. 6 is a process flow diagram illustrating three processes (A, B and C) being conventionally distributed by an operating system between three CPUs.

Referring to FIG. 6, shown is a single ROS using multiple CPUs. This is a standard process that happens for operating systems that use multi-processors and parallel processing. The 'spawning' of sub-process Al shows how parallel processing can happen. As described later the Meta Mentor can also perform this type of processing by assigning the addresses and configuring the switches to perform the tasks in the scheduling algorithm. Another difference between an ROS and an MOS, as will be further described below, is in the scheduling of various processes and the overhead required to accomplish this scheduling. As seen in FIG. 6, the state flows from top to bottom and begins with two processes running on two processors and a third processor that is idle. CPU-1 is executing Process A and CPU-3 is running Process C. At some point Process A is stopped, perhaps to wait for a system resource; its state is saved 64 on the stack and Process B state is loaded 68 and CPU-1 starts executing Process B. When the A's resource become available, the ROS assigns CPU-2 to run Process A. The Stack is loaded, the state restored 70 and Process A continues to run on CPU-2. Later an event occurs related to Process C, running on CPU-3, and its process state is saved in its stack 72 and put into a blocked or ready state. Shortly, the same event type happens to process B, on CPU-1, and B's state is saved 74 and CPU-1 is put into an idle state. The next event that happens is Process A spawns a child process A-1, at 76. Process A-1's initial state is established and A-1 is assigned to run on CPU-3, at 78. Process A-1 continues to execute until it is finished and the results are returned to Process A, at 80, and CPU-3 is returned at an idle state. During this time, the ROS loads the state of Process C into CPU-1 registers and starts Process C running on CPU-1, at 82. At some point Process A is changed to the wait state and its state is saved on the stack, at 84. Process B's state is loaded into CPU-2 registers and starts running on CPU-2, at 86. The last state in FIG. 6 is Process C running on CPU-1; Process B running on CPU-2; and CPU-3 is idle.

Figure 7:
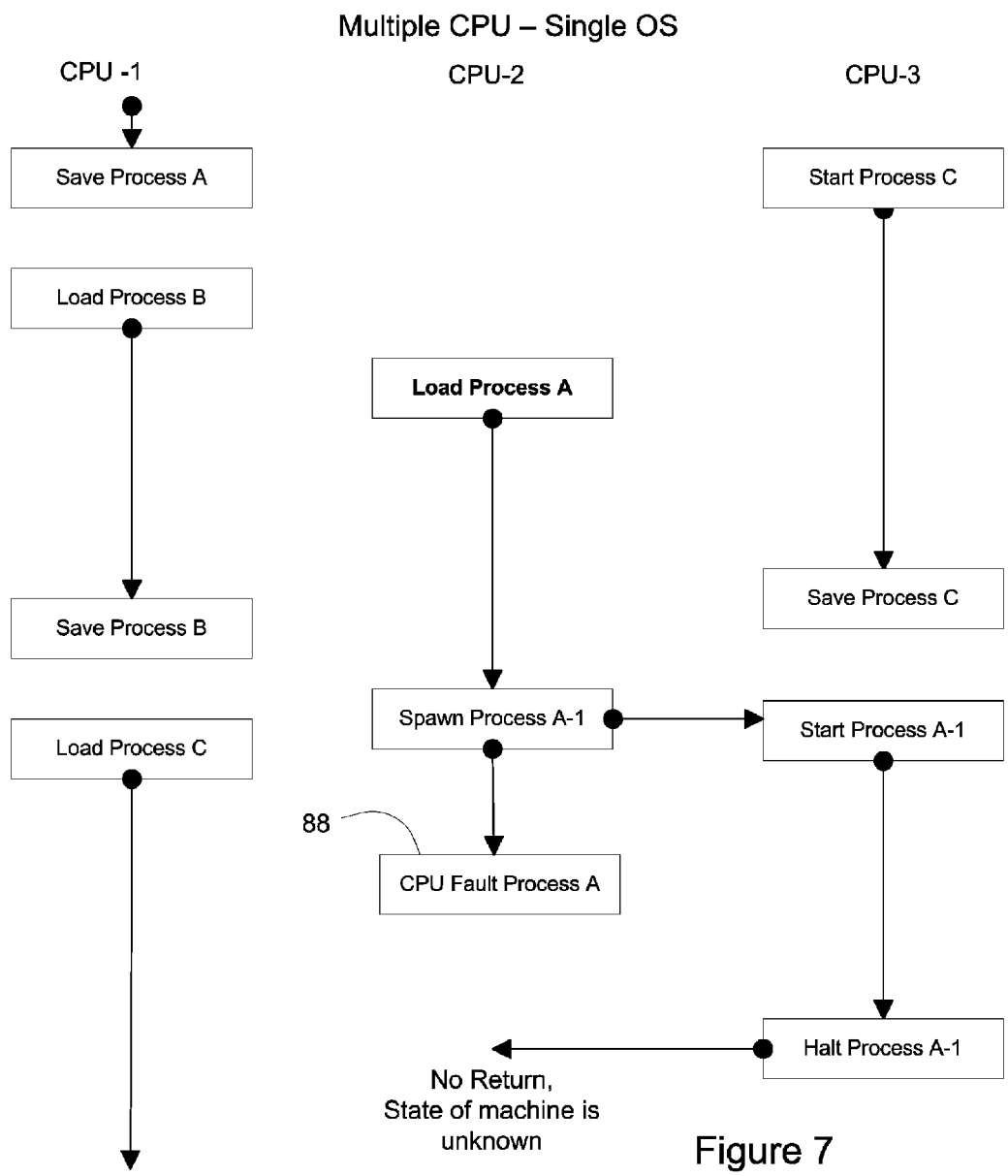
FIG. 7 is a process flow diagram illustrating the catastrophic effect when a parent process (A) is lost in the conventional system of FIG. 6.

Referring to FIG. 7, shown is how problems can arise with a FIG. 6 system when the parent process A is lost and as a result the state of the machines becomes unknown. When this happens the only way to get the machine back is to bring it to a known state, which in this case is the boot state in where all information about the processes is gone. FIG. 7 starts in the same state as FIG. 6; Process A running on CPU-1 and Process C running on CPU-3. Process A is blocked and restarted on CPU-2 where it spawns the child Process A1. The problem occurs when Process A is halted 88 due to a fault and the child (Process A1) is orphaned and has no where to return. The state of the entire machine is unknown. The same type of problem can occur when the child process is halted due to software or hardware error and the parent process waits indefinitely for Process A1 to return its data. After the fault occurs, the only known machine state is the initial state, so the system must be booted. All information about Process A, Process A1, Process B, and Process C is lost.

Figure 8:
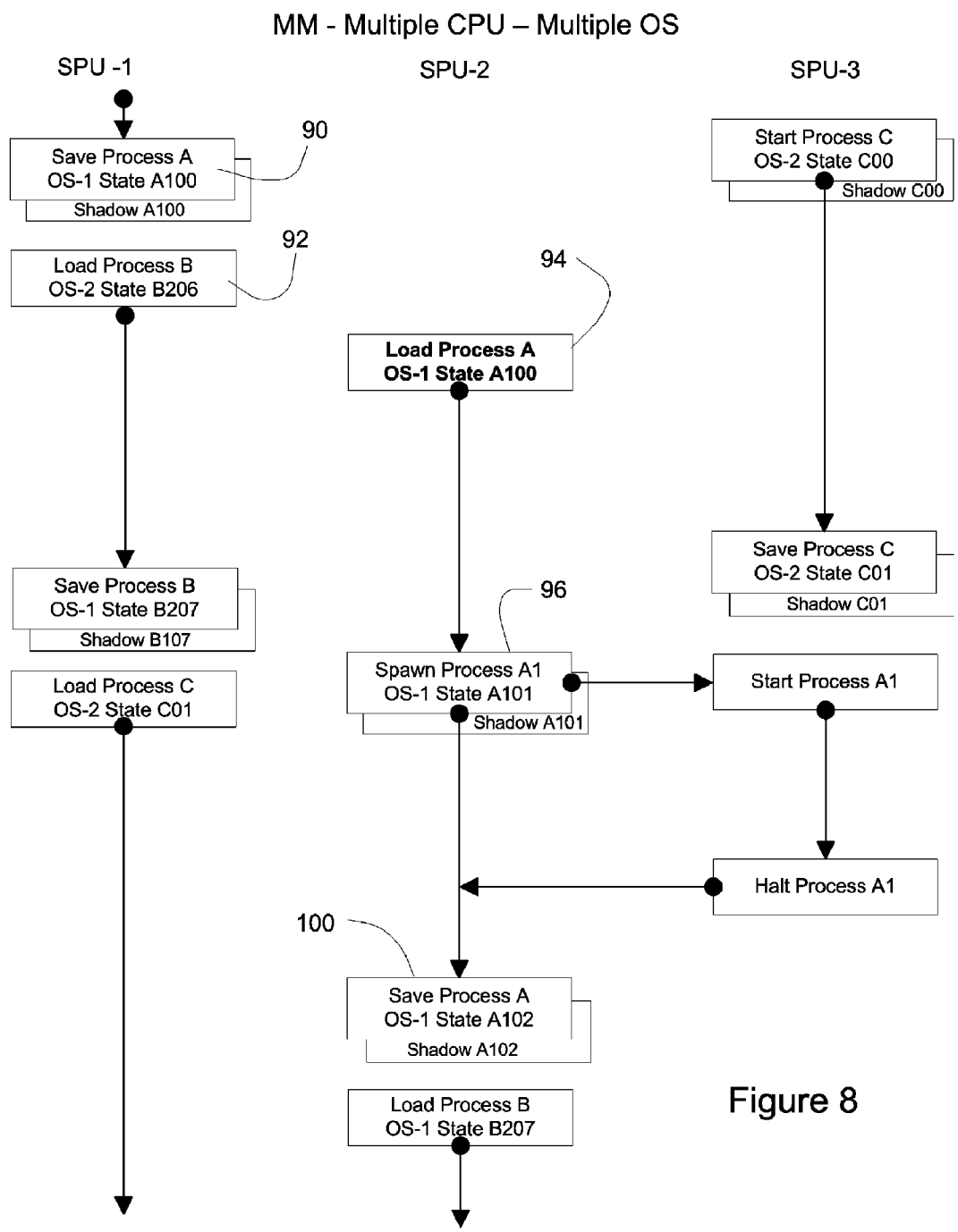
FIG. 8 is a process flow diagram illustrating three processes (A, B and C) running under two operating systems (OS-1 and OS-2) being distributed between three SPUs controlled by a Meta Mentor according to this invention.

Referring to FIG. 8, shown is the Meta Mentor's method of handling the interrupts, stacks, and service routines. The starting state flow shows two processes running, Process A, using OS-1 on SPU-1 and Process C, using OS-2 on SPU-3, with SPU-2 in an idle state. Using compatible Operating System type 1 (OS-1) running on SPU-1, Process A is moved from run to ready (or blocked) 90 and the virtual machine state is defined as state A100. At that time it saves the stack to two locations defined by the MM switches. This is the 'dual porting' mentioned earlier. Following this definition only one of the two sets of state data is updated. This allows the machine's state to be defined at all times. Process B is using OS-2 for its ROS. This is the second OS whose address spaces are loaded at boot and is compatible with SPU-1. The two operating systems can co-function because the MM is dividing the address space through its algorithm, cache, routing tables, and switch configurations. SPU-1 starts executing Process B, at 92, by changing its OS-2 state from ready to run. Later, Process A state is changed from ready to run on SPU-2 using OS-1, at 94. Still later, Process A spawns a parallel process, A1 on SPU-3, at 96. At this time, the machine state is saved on the dual stack defined by the MM. Process A1 completes and its process state is changed from run to halt 98. When sub-Process A1 is moved to the halt state, the MM marks SPU-3 available for another process and can release or save the stack memory for future reference. Still later, Process A is changed from run to ready and its virtual machine state is dual ported and saved, at 100. Previous states are irrelevant at this point, but all states may be saved if caution and policy dictates saving the whole thing.

FIG. 8 also depicts how Process C starts on SPU-3 using OS-2. The MM moves Process C from a new-state to the ready-state, after the MMCPU loads the newly created stack with information to start a first process, defined as state C00. Process C will be in the ready state and then can go to the run state. The MM interrupts SPU-3's idle state to start Process C using the stack the MM just created. When the process is running, it can either go to blocked or ready. If it is blocked, the SPU-3 is waiting for a resource that has been scheduled and configured by the MMCPU and its algorithm. If Process C goes to the ready state it is due to the MMCPU's scheduling operation has 'aged out' the process to allow other processes to run a time slice in this multi-processing environment. Suppose the last state of Process C is blocked, the machine will go from blocked to ready when that resource notifies the MMCPU algorithm that the resource is ready. The MMCPU then schedules SPU-1 for the program execution and interrupts the SPU-1 and assigns it an address space in the switches as the machine moves from state blocked to ready to run. Processor SPU-1 is selected to run by the scheduling algorithms in the MMCPU and Process C continues running.

These examples show how the microprocessor based SPUs are assigned to the process or thread rather than an operating system. This is part of the erection process. Peripherals are handled the same way. The virtual machine is erected just in time to minimize the process changing from the run to blocked state. Process B, scheduled and run by the MM is just there and gone. Open files are safely updated by dual ported buffers, caches, and temp file solutions. This means that at intervals within a program, each state of the process is known as it moves from process to process. Again, this is accomplished by dual porting the memory and data at known states, and starting the process acting on only one set of the data. This way if any process fails, for any reason, the machine can reduplicate the state and restart the machine from a known and reproducible state. Note that the use of "state" here means the machine state and means knowing the addresses and values of the stack variables and that the file data is good. From this known machine state the machine can replay the sequence of processes and threads up to the time of the fault. If the fault was caused by hardware malfunction, the system will continue past the point of the fault with or without dual porting the data. If the fault were caused by some logical error, the MM algorithms would time out the process and trigger an alarm concerning the fault to a device outside the internal frame of reference.

Figure 9:
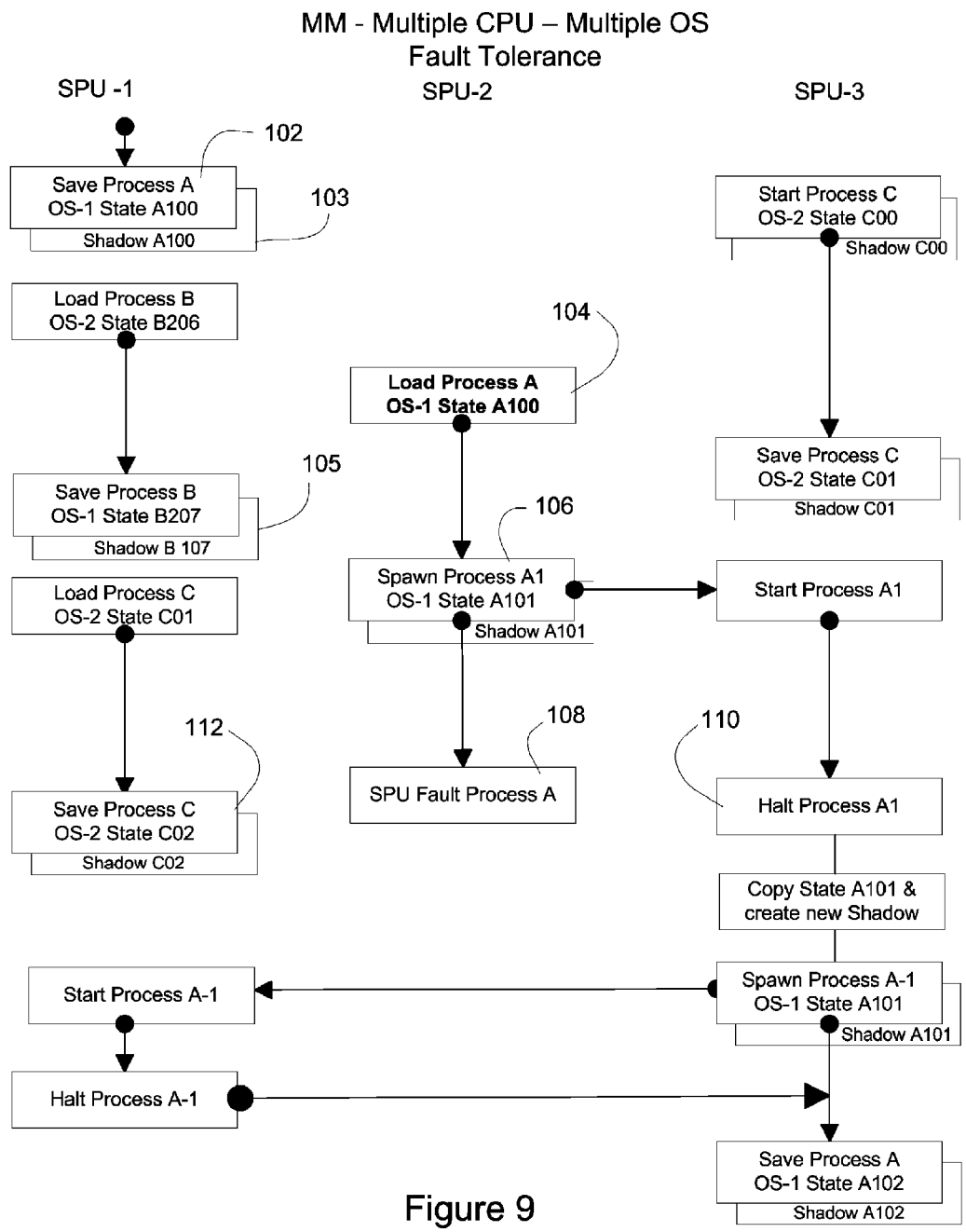
FIG. 9 is a process flow diagram illustrating the same situation as FIG. 8 but further illustrating a recovery following a fault in process A.

Referring to FIG. 9, shown is how a Meta Mentor system can recover from a mechanical or hardware failure, in this example a processor (SPU) failure. Process A is running OS-1 and the machine state Al 00 is saved, at 102. As previously described Process B, running OS-2 begins executing on SPU-1 from its state, B206. As previously described, Process A's state A100 information, is loaded into SPU-2, at 104. Then Process A is changed from the ready to run state on SPU-2 and spawns process A1, at 206. After the sub-Process A1 is started, SPU-2 fails and notifies the MM, at 108. The MM changes all processes and sub-processes associated with Process A to halt states, including sub-Process A1, at 110. In addition, because Process A has a 'higher priority' than Process C, Process C state information is saved and the Process C is brought from the run to ready state, at 112. The MM goes to the last known Process A state, in this case it is A101. However, it is a matter of choice how as to how and where the MM defines the machine state. The MM could have restarted from A100 and in this example the only thing lost would have been recovery time. Preferably the MM finds the last machine state, dual ports the data and restarts the process at the last known state. The dual porting is done through the MM address structure and switch settings. New devices are then scheduled and although the process has lost some time, it continues without a problem.

The same can almost be said for a process error, i.e. a programming error. Although the MM cannot recover from such an error because the algorithm may not be able to decipher the logical error, such as an infinite loop, or errant pointer, the MM can nevertheless halt all processes associated with the offending process bringing the machine to a known state and notifying a device outside its frame of reference about the problem and where it occurred. This is much better diagnostic information than a simple stack dump.

Figure 10:
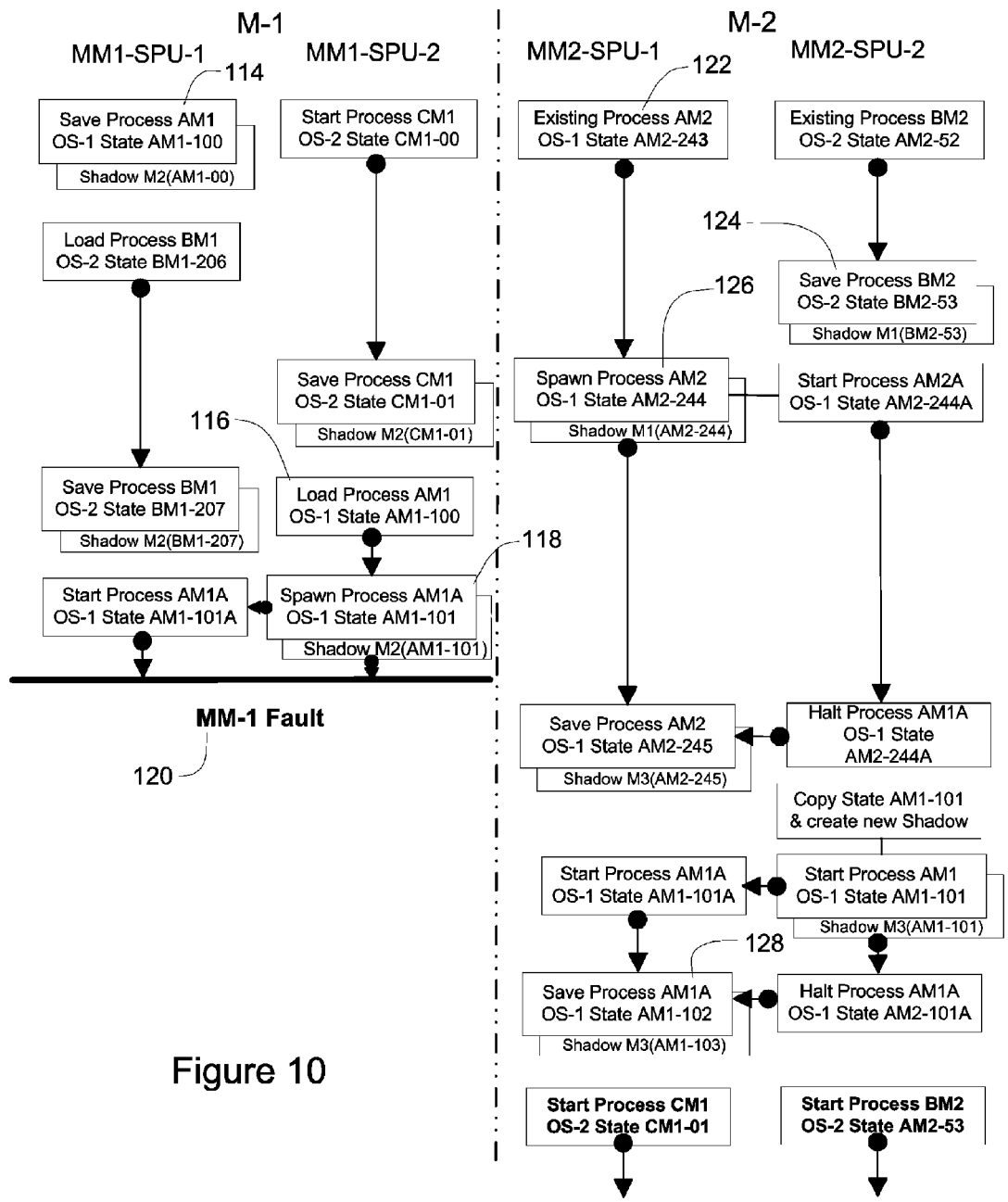
FIG. 10 is a process flow diagram illustrating two Meta Mentors (M-1, M-2), executing five processes (M-1: AM1, BM1, CM1; M-2: AM2, BM2) using two operating systems (OS-1 and OS-2) showing a recovery following a fault in Meta Mentor M-1.

Referring to FIG. 10, shown are two Meta Mentors, M1 and MM2 in an example of how a Meta Mentor system can recover from a Meta Mentor failure. The previously described Process A is now called Process AM1 running OS-1 and the machine state AM1-100 is saved, at 114. The saved state is located at M-1 and the saved shadow state is located in M-2 using a process explained later. As previously described, Process B, now called BM1, running OS-2 begins executing on MM1-SPU-1 from its state, BM1-206. As previously described, Process AM1's state AM1-100 information is loaded into MM1-SPU-2, from either MM-1 or MM02 at 116. Then Process AM1 is changed from the ready to run state on MM1-SPU-2 and spawns sub-process AM1A, at 118. After the sub-Process AM1A is started, M-1 fails and M-2 determines the failure through a watch dog timer or other means, at 120.

Meta Mentor 2, M-2, is shown at 122 executing processes, AM2 running OS-1 at the last know state of AM2-243 and BM2 running OS-2 at the last know state of AM2-52. Process BM2 is moved from run to ready at 124. AM2 spawns sub-Process AM2-244a at 126. The AM2-244 state is saved on both MM-1 and MM-2. While BM1-244 and BM1-244a is running, M-1 faults and M-2 continues to execute the BM1 process normally until sub-Process AM2-244A completes where Process AM2 is moved from run to ready. State AM2-245 is saved in M-2 and a third separate M-3 (not shown) because M-1 is no longer available. Process AM1 previously running on M-1, state AM1-101 is moved from run to ready on M-2 and spawns sub-process AM1A saving the state AM1-101 on M3 and completes its task normally on M-2 at 128. M-2 then moves process CM1, previously running on the failed M-1, from ready to run on M-2 using MM2-SPU-1. Process BM2 using MM2-SPU-2, previously running on M-2 is moved from ready to run. The dual porting in FIG. 10 is done through address structure, switch settings, and the communications between Meta Mentor devices. Although some time is lost, it continues without a problem across Meta Mentor devices.

Referring again to FIGS. 8-10, the shadow boxes (e.g. 103 and 105 of FIG. 8) illustrate shadow memories that are preferably designated blocks of memory available to the host MM, or can alternatively be memory of another separate MM in case the host MM fails—part of the KAC feature of this invention. The shadow memories get updated for each process thread whenever a stack event occurs.

Figure 11:
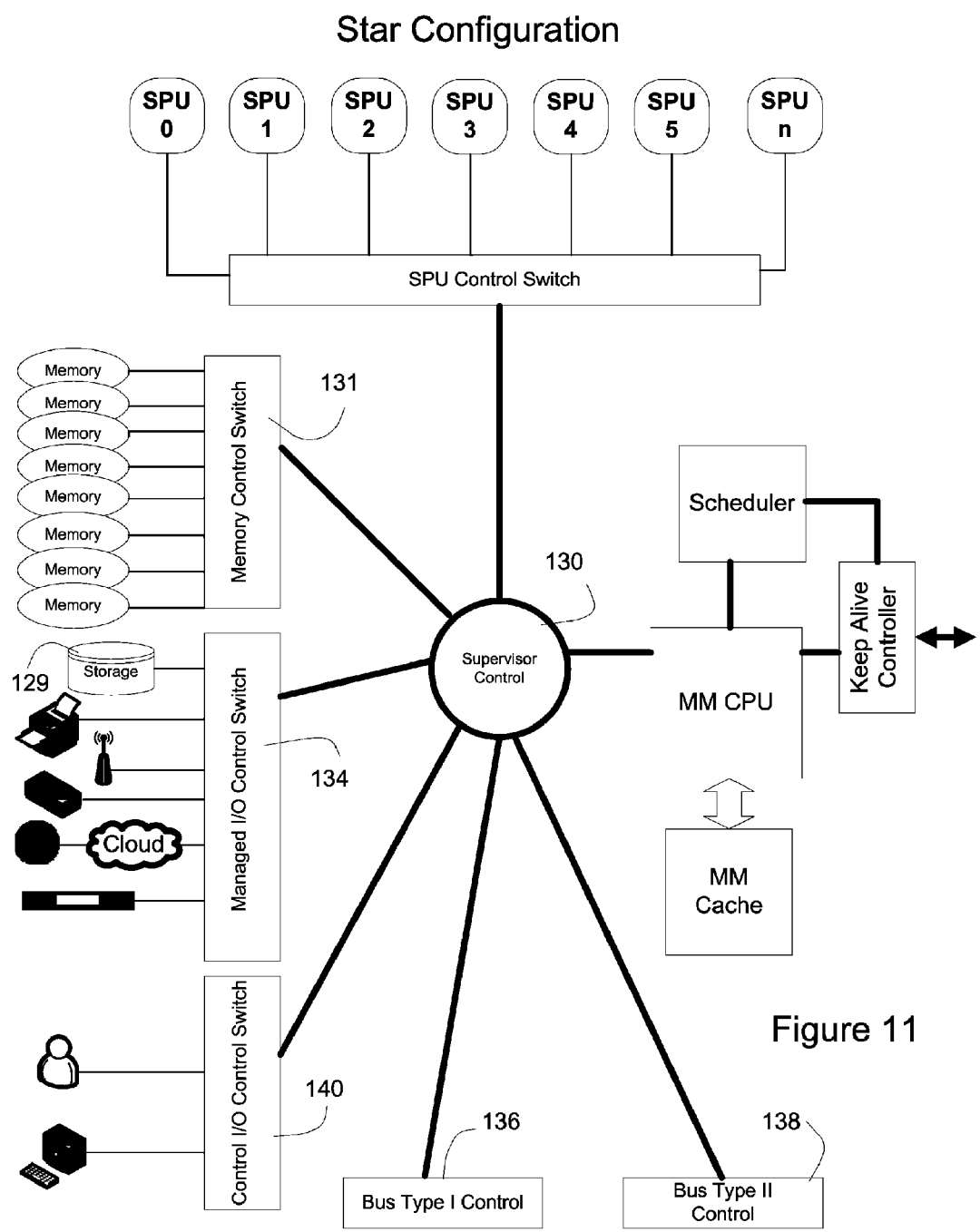
FIGS. 11-13 are block diagrams illustrating different network configurations of a Meta Mentor topology according to this invention.

Referring to FIG. 11, shown is a Meta Mentor in star topology to illustrate that the Meta Mentor system according to this invention is independent of the physical topology shown in FIG. 3. In this arrangement a supervisor control (SC) process 130 manages the switch settings and data of the physical and logical resources to and from the peripheral control switches as determined by the MM algorithms. For example, a typical disk storage facility 129 is connected to a managed I/O control switch (MIOCS) 134. The disk storage units that are connected to the MIOCS have their own characteristics and physical organization. Data fetched from a disk can be, and usually is, grouped by data blocks whose size is determined by the physical characteristics of the device. The actual electronic retrieval from the physical device is performed by the disk's controller and is considered outside the MM's frame of reference. Either the ROS or MOS keeps a table within its frame of reference to determine which block is being read and which block will be read next, depending upon the operating system model. For this exemplary embodiment, the ROS will be responsible for the table. In addition, each operating system has its own methods and format of accessing these devices including the logical files located within the disk storage devices. Both the MOS and ROS abstracts from the physical properties of its storage devices to define a logical storage unit, the file. The function of the MOS is to facilitate and mentor the various ROS's in these operations in a hierarchical fashion.

To read from a file, the ROS specifies the name of the file and where the next block of the file is stored. The lists of blocks are located in a hierarchal place called a directory table that has organized the disk by directories. The ROS searches the directory table for the associated directory entry where it is provided a pointer to the next block to be read. Once that block is read, the pointer is updated. This is part of the state (stack) information. Reading each data block as needed from a disk is a time consuming process while caching several blocks of data into a faster storage system (the cache) on a temporary basis streamlines the process. Many controllers, especially those for block devices, support caching through a process called direct memory access (DMA). In practice, the ROS will cache several blocks of data in its memory to increase its performance. The cache memory can be part of the disk controller or part of the MM's memory or both. It is instructive to understand how DMA works in the MM memory.

When DMA is used to create a data cache it bypasses the processor (SPU) and allows the disk controller to write directly into the MOS managed memory. The process is started by the ROS requesting data from the storage device. The ROS checks to see if the data is cached in a virtual location defined by the MOS. If it is, the information is read directly from the cache in a manner previously described. If not, the information is read from the disk to a new cache and is created using DMA. Basically DMA requires the ROS to give the disk controller two items of information: the disk address of the disk block and the memory address where the block is stored. The request is modified by the MM algorithm and directs the switch settings so that the controller writes to a virtual address defined by the MOS. Likewise, when the new cache is read by the ROS it is the MOS that defines its location and where the block pointers are located. The disk controller writes data blocks in the usual fashion to a virtual address and ROS reads from the virtual address. The MM manages all of the address spaces and processes by mapping the actual address to the virtual space.

The same type of process happens with either peripherals bus type I or type II shown in FIG. 11. A specific peripheral bus can logically connect several peripherals over the same set of wires and is shown here to illustrate how the MM can interact with any type of bus. All buses logically consist of two parts: the bus address and the bus data. In addition, the bus must perform arbitration so that two or more devices cannot talk, i.e., communicate at the same time, and depending on the bus design, there may be other factors including transfer rates and format. Within the MM these details are preferably performed at the component level of a bus control controller, although they can be performed, as shown in FIG. 11, at the supervisor control 130. Requests from a SPU, using a particular application or ROS, to communicate information to a peripheral located on, for example, a Bus Type I is accomplished by the MOS setting the switch and routing information from the SPU through the supervisor control 130 to a Bus Type I controller at 136. Preferably the supervisor control 130 forms the bus packet with the data, address, and routing information to reach a device located on the bus. If two of the same type of device are located on two different buses, 136 and 138, then the MM arbitrates which bus will handle the request. The dynamic nature of these types of requests is unique in the MM. For example, if both peripheral devices were arbitrarily chosen to be a network communication device, the MM arbitrarily picks either bus to place the communication data.

In FIG. 11, a Control I/O Control Switch (CIOCS) 140 is shown to illustrate how external devices that are controlled by the MM are connected. These devices include keyboards and terminals that have direct access to the MM. In the aforementioned keystroke example, the CIOCS is configured to generate an interrupt within the MMCPU to service the keystroke. Any particular port could be configured to the MOS or ROS depending on the context of the switch setting and MM algorithm.

The star configuration of the MM illustrated in FIG. 11 has some inherent limitations. The supervisor control 130 could be a communications bottle neck among the MM components. The SC represents a single point of failure on an individual MM, although connecting more than one MM alleviates the problem.

Figure 12:
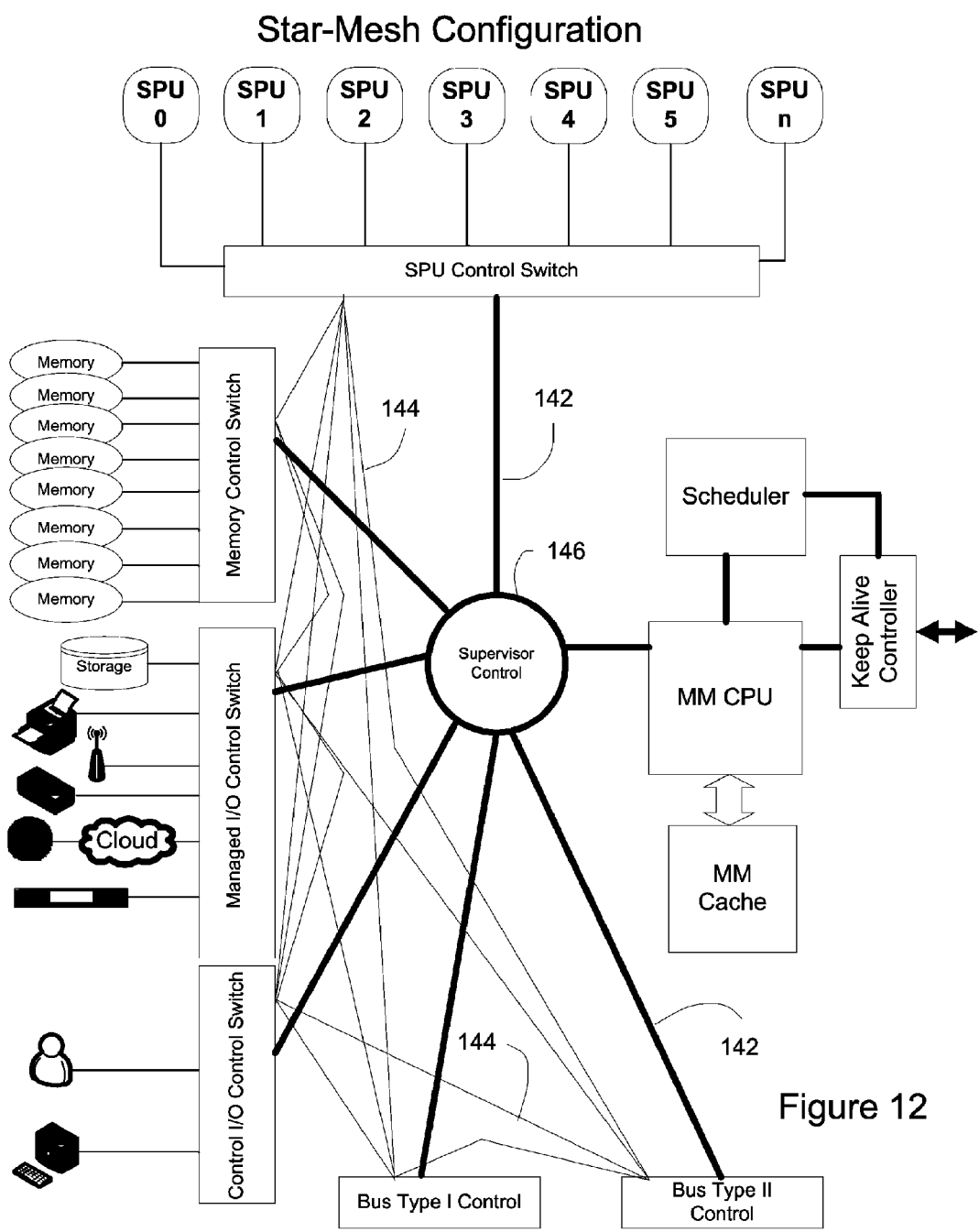

Referring to FIG. 12, shown is an MM in star and mesh topology. The control lines for the switch settings are shown in heavily drawn lines 142, and the more lighter drawn data lines 144 are connected such that each switch connects to every other switch. The SC 146 is the hub of the control lines star formation. This topology has the advantage that every connection has only two 'hops' between any device within the frame of reference. In addition, there is a redundancy option (not shown) between components for more reliability. There are several disadvantages, such as the number of ports needed on each switch and the complexity of such systems. However, the same sorts of algorithms previously described still apply. The MOS controls the virtual address space through its algorithms and switch settings as before. In FIG. 12, only the method of topology and configuration is different from other MM configurations.

Figure 13:
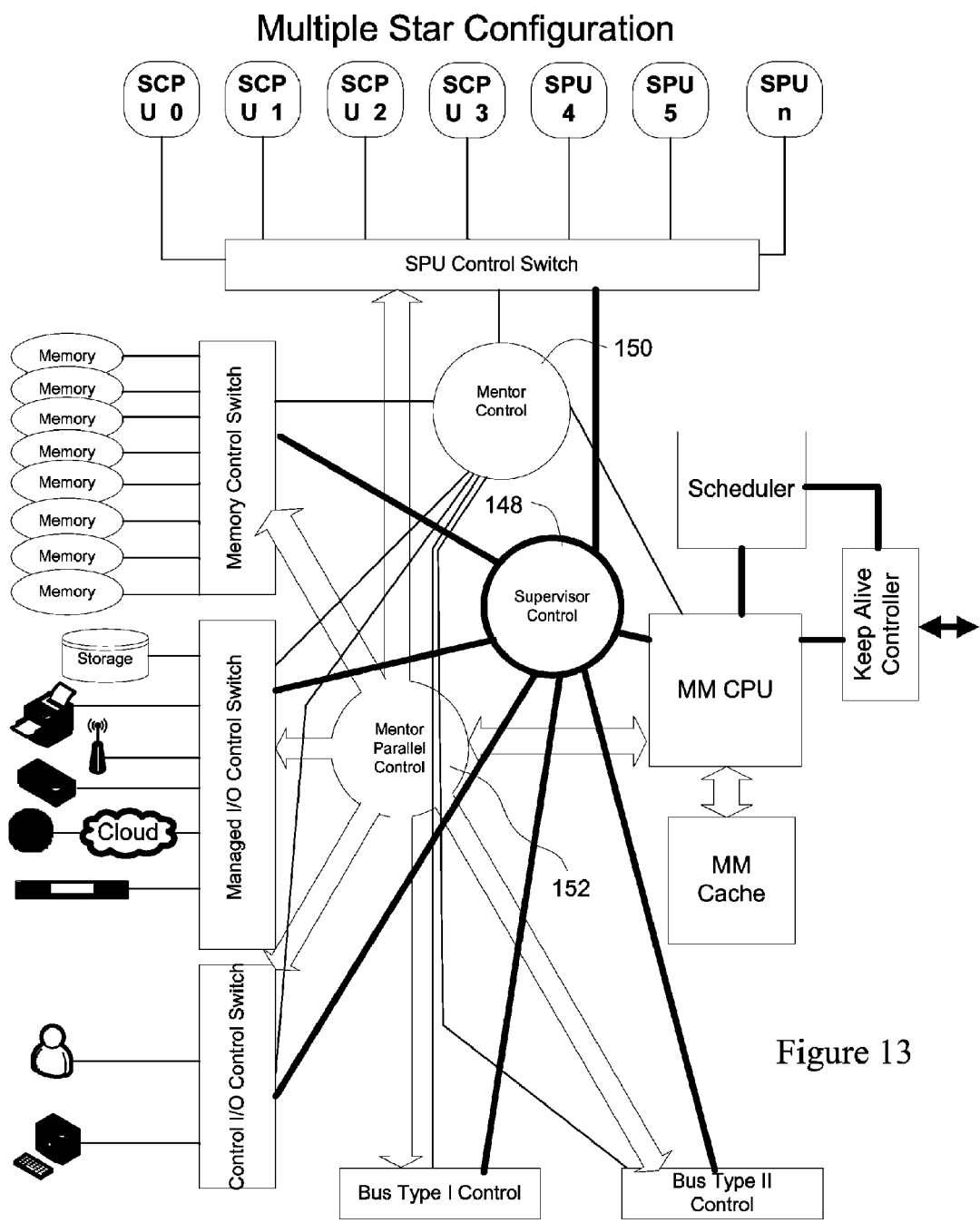

Referring to FIG. 13, shown is an MM in a multiple star configuration. In this topology the control, data, and parallel buses are connected in a star topology. The SC 148 functions as previously described. Although the serial address, data, and process data are connected in a star configuration, in the FIG. 13 configuration they have a separated serial data switch 150 to help alleviate bottle necks with the SC. Also shown is a parallel data bus with a star-configured parallel data switch 152. The basic functionality as previously described remains the same and only the method and topology of connecting the peripheral control switches has changed.

The supervisor control processes of the embodiments illustrated in FIGS. 11-13 (130, 140 and 148) are preferably each a routing process, e.g. 34 of FIG. 3, but in the embodiment of FIG. 13 the mentor controllers (150 and 152) preferably handle the algorithms and coordination between the parallel and serial pathways.

Figure 14:
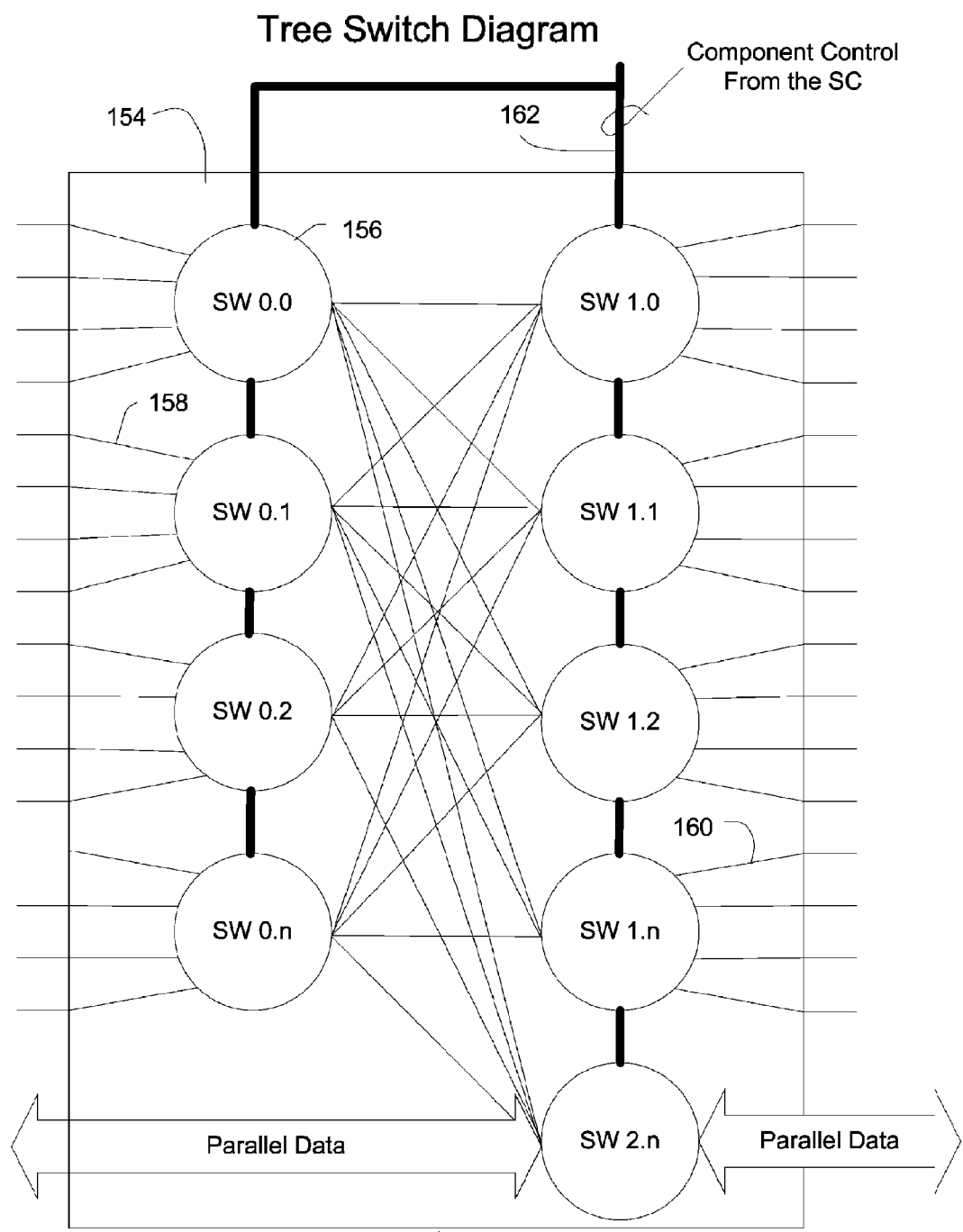
FIGS. 14 and 15 are signal flow diagrams illustrating examples of a tree type switch and a star type switch, respectively, each for routing SPU controls.

Referring to FIG. 14, shown is a typical entity control switch 154 in mesh topology and represents the type of switch that may be utilized in the control switches shown in FIGS. 3, 11, 12, and 13. The illustrated switch depicts both serial and parallel data paths, although the preferable method is a serial data path. Each node 156 within the switch is connected to four entities. These nodes are connected within the switch in a mesh topology where every switch node has only two hops between MM switch nodes. For example, a signal arriving at a line 158 intended to be communicated to a line 160 need only traverse two nodes (only two "hops") SW 0.1 and SW 1.n.

The component control determines the switch settings and protocol information as dictated by the MMCPU algorithm and the dual ported lookup table control device. In this configuration, component control signals 162 from the SC (not shown) format the data and supply the appropriate information for entity, i.e., node control. Expanding on the previous example of an SPU writing data to a bus controller, such as 136 or 138 of FIG. 11, the component control provides the timing and other information that is required by the bus controller. For example, data and address information received on one of the external lines connected to SW 0.0 can be routed to SW 1.2 which then puts the appropriate bus information onto the 'header' of the data packet and passes the packet to another like switch that is connected to the bus controller. The later switch presents the information to the bus controller, who then routes the information to the appropriate device located on the bus it controls, thus completing the operation. The topology of the switch is independent of the MM function; however, it is aligned with the topology of the MM as shown in FIGS. 3, 11, 12, and 13.

Figure 15:
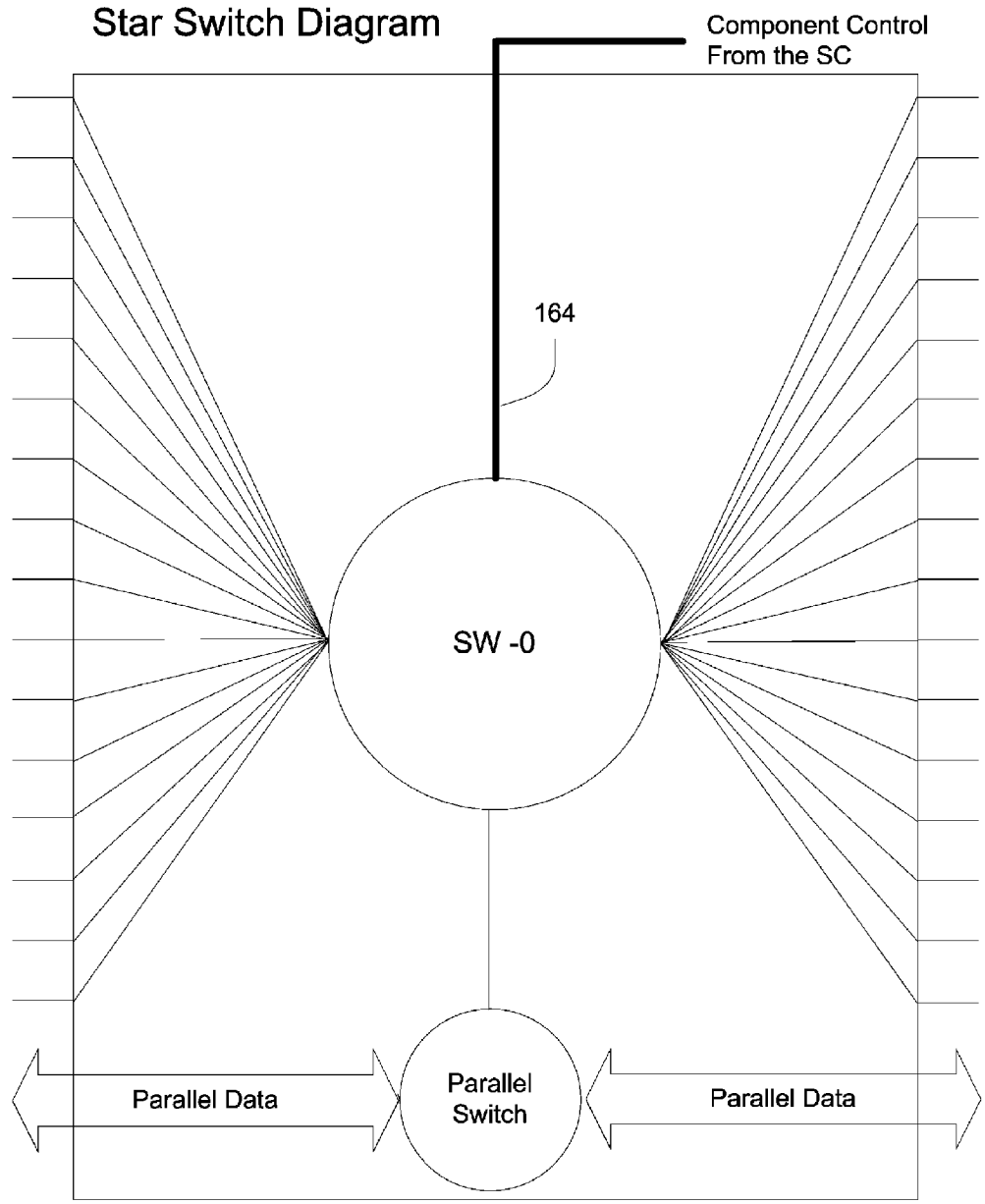

Referring to FIG. 15, shown is a typical entity control switch in a star topology. This configuration has the same control features as previously mentioned, where data, functions, and addresses are presented on each of the serial and parallel lines to the switch. The component control signals 164 route the information and adds the appropriate information to talk to the connected entity or component switch. The topology of this switch would be aligned with the topology of the MM.

Using the previous DMA example, a request from a SPU to a disk entity for a DMA transfer from the disk to a data cache will cause the following switch connections. The MIOCS (e.g. 134 of FIG. 11) connects one of its switch ports to the disk controller and then connects another of its port to the illustrated entity control switch that in turns relays the information to a port on the memory control switch (e.g. 131 of FIG. 11). The memory control switch receives the information and formats it with the appropriate timing so that the data is stored in a location determined by the connections and the address the MOS specified. In addition, the memory control switch provides any additional information that memory may need to store the DMA data. These connections last only long enough to facilitate the DMA and the ports and addresses are made available for other processes.

In this invention, the Meta Mentor schedulers are responsible for scheduling the processors and device allocations and scheduling how these transitions happen. In the MM machine these tasks are no longer the domain of the individual operating system. The MM is responsible for the addresses of all stacks and in that way it is in control of all processes and scheduling. If the files memory spaces are dual ported any point in time, the state of a Meta Mentor machine is known.

Figure 17:
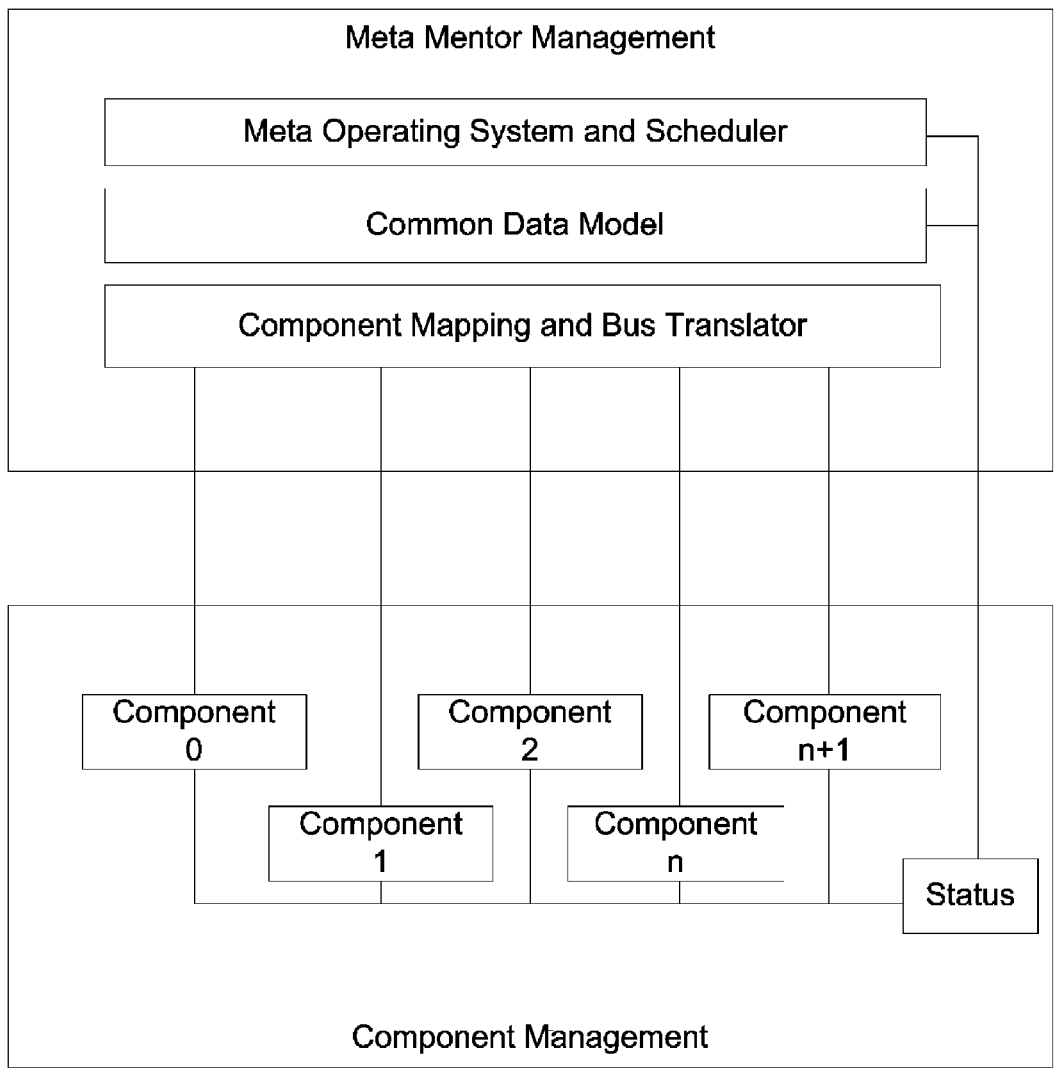
FIG. 17 illustrates the Meta Mentor Management System

Shown in FIG. 17 is the preferred management architecture that provides administrative access to all levels within the MM frame of reference. This approach has two layers, the Meta Mentor Management layer and the Component Management layer. The Meta Mentor Management layer consists of four elements: Meta Mentor Management, Meta Operating System and Scheduler, Common Data Model, and Component Mapping and Bus Translator.

The Meta Mentor Management component provides a unified management tool and a human interface to a Meta Mentor's operation. It is used for communication outside the MM frame of reference and communicating among MM elements within its frame of reference. For example, an operator can shut down a component such as a SPU-4 in FIG. 3 for maintenance using the Meta Mentor Management component. SPU-4 could be replaced without any interruption to any MM service. Using the MM Management component the operator brings SPU-4 'on-line' and the MM device operates without interruption. In another example using the MM Management component several SPUs could be dedicated to an operating system for testing and upgrade purposes without affecting any other process on the system. When using multiple MM devices, even component firmware can be modified using MM Management without affecting the system. In addition, process priorities are set, and system monitoring is accomplished using MM Management.

The Meta Operating System and Scheduler, MOS, provides: algorithms, erection models, scheduling, services, and implements the MM rule sets. It also receives information about the component status which affects how it performs address translations, system algorithms, virtual machine erections, process and component scheduling, and implementation. The MOS also interacts with the various ROS within the MM frame of reference to provide scheduling, memory and object management. In addition, it performs high level commands for the Common Data Model, CDM.

The CDM provides a common interface to manage the components. It is responsible for asset management and classification including: the real and virtual storage locations, Keep Alive Controller, Routing Table, Control Switches and their functions and all other MM assets. It is responsible of implementing commands from the Meta Operating System (MOS) and Scheduler and the Component Mapping and Bus Translator. The CDM also receives information about component status for asset allocation. The CDM also acts with any ROS within the MM frame of reference to provide MM services with the parameters given by the MOS. The CDM provides a common interface to a heterogeneous system and interoperability of MM implementations.

The Component Mapping and Bus Translator, CMBT, is an expanded hardware abstraction layer whose function is to translate the CDM commands from multiple processes to individual components. The CMBT allows the CDM to address the I/O components by performing hardware specific details such as translating commands to electronic signals at the I/O interfaces and processing hardware interrupts. The CMBT also defines communication protocols among MM components.

Besides the Meta Management layer there is the Component Management layer. The Component Management layer consists of a collection of hardware and service objects within the MM frame of reference. The services are thought of as protocols, application programming interfaces, and component status. It is the sum of all generic and MM specific hardware within the MM frame of reference.

The management architecture comprised of the two layers previously described provides a MM methodology for component communication, human interface command and control, a method of implementing rule sets and logic to and from the components, and an interface and coordination of any Regular Operating System that functions within the MM frame of reference.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A fault tolerant computer system comprising:
   a meta processor running an algorithm;
   a plurality of slave processors;
   a slave processor switch in communication with the meta processor and controlled by the algorithm to selectively assign operating systems, and application processes and threads to the slave processors;
   a plurality of memory devices;
   a memory switch in communication with the meta processor and controlled by the algorithm to provide data communication between selected slave processors and selected memory devices over selected memory ranges;
   an I/O switch in communication with the meta processor and controlled by the algorithm to provide data communication between selected slave processors and selected I/O devices; and
   all system and I/O interrupts being communicated to the meta processor and handled by the algorithm.

2. The computer system according to claim 1 further comprising a routing process comprising:
   a lookup table for remembering for each slave processor all memory addresses assigned to said each slave processor by the meta processor algorithm;
   a storage for containing a switching algorithm; and
   switching logic that executes the switching algorithm, the switching logic being in communication with the slave processor switch, the memory switch and the I/O switch for controlling said switches according to the switching algorithm;
   the lookup table being dual ported for access by both the meta processor and the switching logic;
   the switching algorithm storage being dual ported for access by both the meta processor and the switching logic.

3. The computer system according to claim 1 wherein one of said switches is a tree switch.

4. The computer system according to claim 1 further comprising:
   a peripheral bus port for communication between the system and any peripherals coupled to the bus,
   data links between the bus port and the switches, and
   a control link between a routing process and the bus port for control of the port by the routing process, the routing process including a routing table selectively modifiable by the meta processor.

5. The computer system according to claim 4 further comprising a supervisor process in control communication with the meta processor, the switches and the peripheral bus port via a star topology control network.

6. The computer system according to claim 4 further comprising:
   a supervisor process in control communication with the meta processor, the switches and the peripheral bus port via a star topology control network, and
   a mesh topology data communication network interconnecting the switches and the bus port.

7. The computer system according to claim 4 further comprising:
   a supervisor process in control communication with the meta processor, the switches and the peripheral bus port via a star topology control network,
   a serial data switch linking the meta processor, the switches and the peripheral bus port in a star topology, and
   a parallel data switch linking the meta processor, the switches and the peripheral bus port in a star topology.

8. A fault tolerant computer system comprising:
   at least two mirror meta modules, each module comprising:
   a meta processor running an algorithm;
   a plurality of slave processors;
   a slave processor switch in communication with the meta processor and controlled by the algorithm to selectively assign operating systems, and application processes and threads to the slave processors;
   a plurality of memory devices;
   a memory switch in communication with the meta processor and controlled by the algorithm to provide data communication between selected slave processors and selected memory devices over selected memory ranges;
   an I/O switch in communication with the meta processor and controlled by the algorithm to provide data communication between selected slave processors and selected I/O devices; and
   all system and I/O interrupts being communicated to the meta processor and handled by the algorithm; and
   a keep-alive controller linking each meta module to a mirror meta module for communicating from time to time the real time states of processes and threads running in said meta module to said mirror meta module, said states being used to recover processes and threads that have faulted due to a problem in said each meta module.

9. The computer system according to claim 8 further comprising for said each module a cache memory for periodically storing the real time states of said each's mirror meta module.

10. The computer system according to claim 8 further comprising for said each module:
    a peripheral bus port for communication between the system and any peripherals coupled to the bus,
    data links between the bus port and the switches, and
    a control link between the routing process and the bus port for control of the port by the routing process.

11. The computer system according to claim 8 wherein said each module further comprises a routing process comprising:
    a lookup table for remembering for each slave processor all memory addresses assigned to said each slave processor by the meta processor algorithm;
    a storage for containing a switching algorithm; and
    switching logic that executes the switching algorithm, the switching logic being in communication with the slave processor switch, the memory switch and the I/O switch for controlling said switches according to the switching algorithm;
    the lookup table being dual ported for access by both the meta processor and the switching logic;
    the switching algorithm storage being dual ported for access by both the meta processor and the switching logic.

12. The computer system according to claim 8 wherein one of said switches is a tree switch.

13. A fault tolerant computer architecture for a meta operating system comprising:
    a meta processor for running the meta operating system;
    a plurality of slave processors;
    a slave processor switch in communication with the meta processor and controlled by the meta operating system to selectively assign operating systems, and application processes and threads to the slave processors;

a plurality of memory devices;

a memory switch in communication with the meta processor and controlled by the meta operating system to provide data communication between selected slave processors and selected memory devices over selected memory ranges;

an I/O switch in communication with the meta processor and controlled by the meta operating system to provide data communication between selected slave processors and selected I/O devices; and all system and I/O interrupts being communicated to the meta processor and handled by the meta operating system.

14. The computer architecture according to claim 13 further comprising:

a peripheral bus port for communication between the system and any peripherals coupled to the bus, data links between the bus port and the switches, and a control link between the routing process and the bus port for control of the port by the routing process.

15. The computer architecture according to claim 14 further comprising:

a supervisor process in control communication with the meta processor, the switches and the peripheral bus port via a star topology control network, and a mesh topology data communication network interconnecting the switches and the bus port.

16. The computer architecture according to claim 14 further comprising:

a supervisor process in control communication with the meta processor, the switches and the peripheral bus port via a star topology control network, a serial data switch linking the meta processor, the switches and the peripheral bus port in a star topology, and a parallel data switch linking the meta processor, the switches and the peripheral bus port in a star topology.

17. The computer architecture according to claim 13 further comprising a routing process comprising:

a lookup table for remembering for each slave processor all memory addresses assigned to said each slave processor by the meta operating system;

a storage for containing a switching algorithm; and switching logic that executes the switching algorithm, the switching logic being in communication with the slave processor switch, the memory switch and the I/O switch for controlling said switches according to the switching algorithm;

the lookup table being dual ported for access by both the meta processor and the switching logic;

the switching algorithm storage being dual ported for access by both the meta processor and the switching logic.

18. The computer architecture according to claim 13 wherein one of said switches is a tree switch.

19. The computer architecture according to claim 13 further comprising a supervisor process in control communication with the meta processor, the switches and the peripheral bus port via a star topology control network.

* * * * *